(12) United States Patent
Kirschman

(10) Patent No.: US 10,362,382 B2
(45) Date of Patent: Jul. 23, 2019

(54) EARPIECE FOR A MOBILE DEVICE

(71) Applicant: David Louis Kirschman, Dayton, OH (US)

(72) Inventor: David Louis Kirschman, Dayton, OH (US)

(73) Assignee: Thunderhill Investments, LLC, Dayton, OH (US)

( * ) Notice: Subject to any disclaimer, the term of this patent is extended or adjusted under 35 U.S.C. 154(b) by 0 days.

(21) Appl. No.: 15/472,772

(22) Filed: Mar. 29, 2017

(65) Prior Publication Data
US 2018/0139526 A1    May 17, 2018

Related U.S. Application Data

(60) Provisional application No. 62/440,107, filed on Dec. 29, 2016, provisional application No. 62/422,798, filed on Nov. 16, 2016.

(51) Int. Cl.
| | | |
|---|---|---|
| *H04R 1/10* | (2006.01) |
| *H04M 1/05* | (2006.01) |
| *H04M 1/725* | (2006.01) |
| *H04R 1/28* | (2006.01) |
| *H04M 1/60* | (2006.01) |
| *H04M 1/02* | (2006.01) |
| *H04M 1/03* | (2006.01) |
| *G10K 11/08* | (2006.01) |
| *H04M 1/18* | (2006.01) |

(52) U.S. Cl.
CPC .......... *H04R 1/1016* (2013.01); *G10K 11/08* (2013.01); *H04M 1/0254* (2013.01); *H04M 1/035* (2013.01); *H04M 1/05* (2013.01); *H04M 1/6058* (2013.01); *H04M 1/72527* (2013.01); *H04R 1/1041* (2013.01); *H04R 1/1058* (2013.01); *H04R 1/2811* (2013.01); *H04M 1/0202* (2013.01); *H04M 1/185* (2013.01); *H04M 1/6066* (2013.01); *H04R 1/105* (2013.01); *H04R 2420/07* (2013.01); *H04R 2499/11* (2013.01)

(58) Field of Classification Search
CPC .. H04B 1/3888; H04M 1/025; H04M 1/6058; H04R 1/1016
See application file for complete search history.

(56) References Cited

U.S. PATENT DOCUMENTS

| | | | | |
|---|---|---|---|---|
| 1,654,193 | A  * | 12/1927 | Steuart | H04R 1/083 |
| | | | | 181/22 |
| 5,528,689 | A  * | 6/1996 | Chan | H04B 1/385 |
| | | | | 379/430 |
| 5,613,222 | A  * | 3/1997 | Guenther | B60R 11/0247 |
| | | | | 379/430 |
| 6,363,139 | B1 | 3/2002 | Zurek et al. | |

(Continued)

FOREIGN PATENT DOCUMENTS

| | | | | |
|---|---|---|---|---|
| DE | 202013007023 | | 9/2013 | |
| FR | 2812154 | A1 * | 1/2002 | .......... H04M 1/6058 |

(Continued)

*Primary Examiner* — Curtis A Kuntz
*Assistant Examiner* — Ryan Robinson
(74) *Attorney, Agent, or Firm* — Jacox, Meckstroth & Jenkins

(57) ABSTRACT

Various embodiments of an earpiece for a mobile device. The earpiece is detachably mounted to the mobile device and provides sound amplification for a user.

57 Claims, 24 Drawing Sheets

(56) References Cited

U.S. PATENT DOCUMENTS

| | | | |
|---|---|---|---|
| 6,636,750 B1 | 10/2003 | Zurek et al. | |
| 7,167,733 B2 | 1/2007 | Tsai | |
| 7,539,302 B2 | 5/2009 | Kulas | |
| 7,894,620 B2 | 2/2011 | Yang | |
| 8,005,517 B2 | 8/2011 | Kang et al. | |
| 8,098,868 B2 | 1/2012 | Kim et al. | |
| 8,103,035 B2 | 1/2012 | Parker et al. | |
| 8,201,561 B2 * | 6/2012 | Blanchard | A61F 11/08 128/846 |
| 8,270,637 B2 | 9/2012 | Abolfathi | |
| D689,476 S | 9/2013 | Alexander | |
| 8,532,325 B2 | 9/2013 | Tung et al. | |
| 8,596,412 B1 | 12/2013 | Jorgensen | |
| 8,761,432 B1 | 6/2014 | Cheng | |
| 8,767,992 B2 | 7/2014 | Lester, Jr. | |
| D714,282 S | 9/2014 | Cheon | |
| 8,867,770 B2 | 10/2014 | Chien et al. | |
| 8,929,060 B2 | 1/2015 | Waitzman, III et al. | |
| 9,010,348 B1 * | 4/2015 | Kite | E04H 15/08 135/88.06 |
| 9,123,935 B2 | 9/2015 | Huang | |
| 9,294,659 B1 * | 3/2016 | Bednarik | H04N 5/2254 |
| 9,564,680 B2 * | 2/2017 | Lehmann | H01Q 1/245 |
| 9,577,695 B2 | 2/2017 | Huang | |
| 9,961,434 B2 * | 5/2018 | Kelly | H04R 1/1066 |
| 2002/0009195 A1 | 1/2002 | Schon | |
| 2004/0125979 A1 * | 7/2004 | Elidan | H04R 1/1075 381/382 |
| 2005/0089186 A1 | 4/2005 | Kulas | |
| 2007/0135185 A1 | 6/2007 | Dvorak et al. | |
| 2010/0183179 A1 | 7/2010 | Griffin, Jr. et al. | |
| 2011/0170725 A1 | 7/2011 | Liu | |
| 2012/0024619 A1 | 2/2012 | Lin | |
| 2012/0027237 A1 | 2/2012 | Lin | |
| 2012/0237058 A1 | 9/2012 | Salomaa et al. | |
| 2012/0294469 A1 | 11/2012 | Weaver, III | |
| 2012/0303146 A1 | 11/2012 | Genov et al. | |
| 2012/0303520 A1 | 11/2012 | Huang | |
| 2013/0045782 A1 | 2/2013 | Simmer | |
| 2013/0048413 A1 | 2/2013 | Patzer | |
| 2013/0170686 A1 | 7/2013 | Lester, Jr. | |
| 2013/0207806 A1 * | 8/2013 | Lehmann | H04B 1/3838 340/600 |
| 2013/0236044 A1 | 9/2013 | Hsu | |
| 2014/0057685 A1 | 2/2014 | Shih | |
| 2014/0166390 A1 | 6/2014 | Center et al. | |
| 2014/0193019 A1 | 7/2014 | Yan et al. | |
| 2014/0226268 A1 * | 8/2014 | O'Neill | G03B 15/06 361/679.01 |
| 2014/0367193 A1 | 12/2014 | Center et al. | |
| 2015/0027802 A1 | 1/2015 | Altschul et al. | |
| 2015/0131836 A1 | 5/2015 | Hoshikawa | |
| 2016/0043764 A1 | 2/2016 | Huang | |
| 2017/0237843 A1 * | 8/2017 | Ackeret | H04M 1/04 455/575.9 |

FOREIGN PATENT DOCUMENTS

| | | | |
|---|---|---|---|
| WO | WO 2007062291 | 5/2007 | |
| WO | WO2007062291 A2 | 5/2007 | |
| WO | WO 2013067390 | 5/2013 | |
| WO | WO2013067390 A2 | 5/2013 | |
| WO | WO 2015190915 A1 * | 12/2015 | H04M 1/0216 |

* cited by examiner

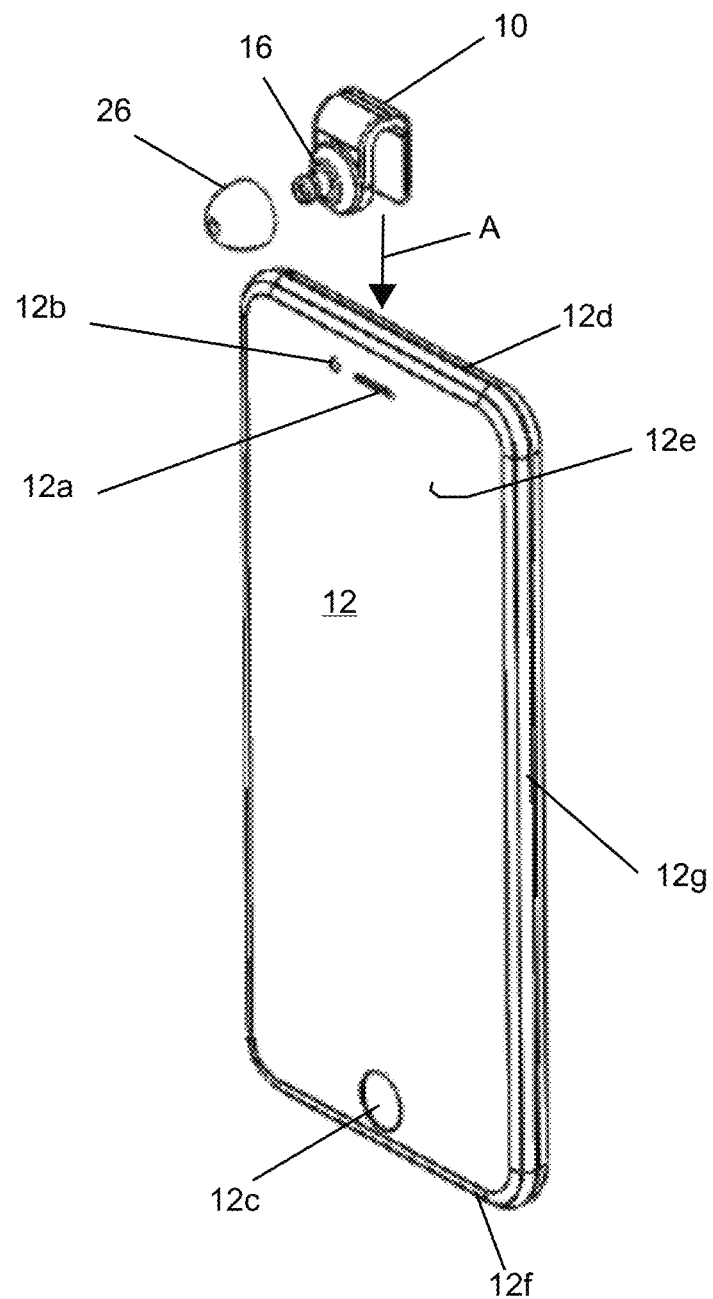

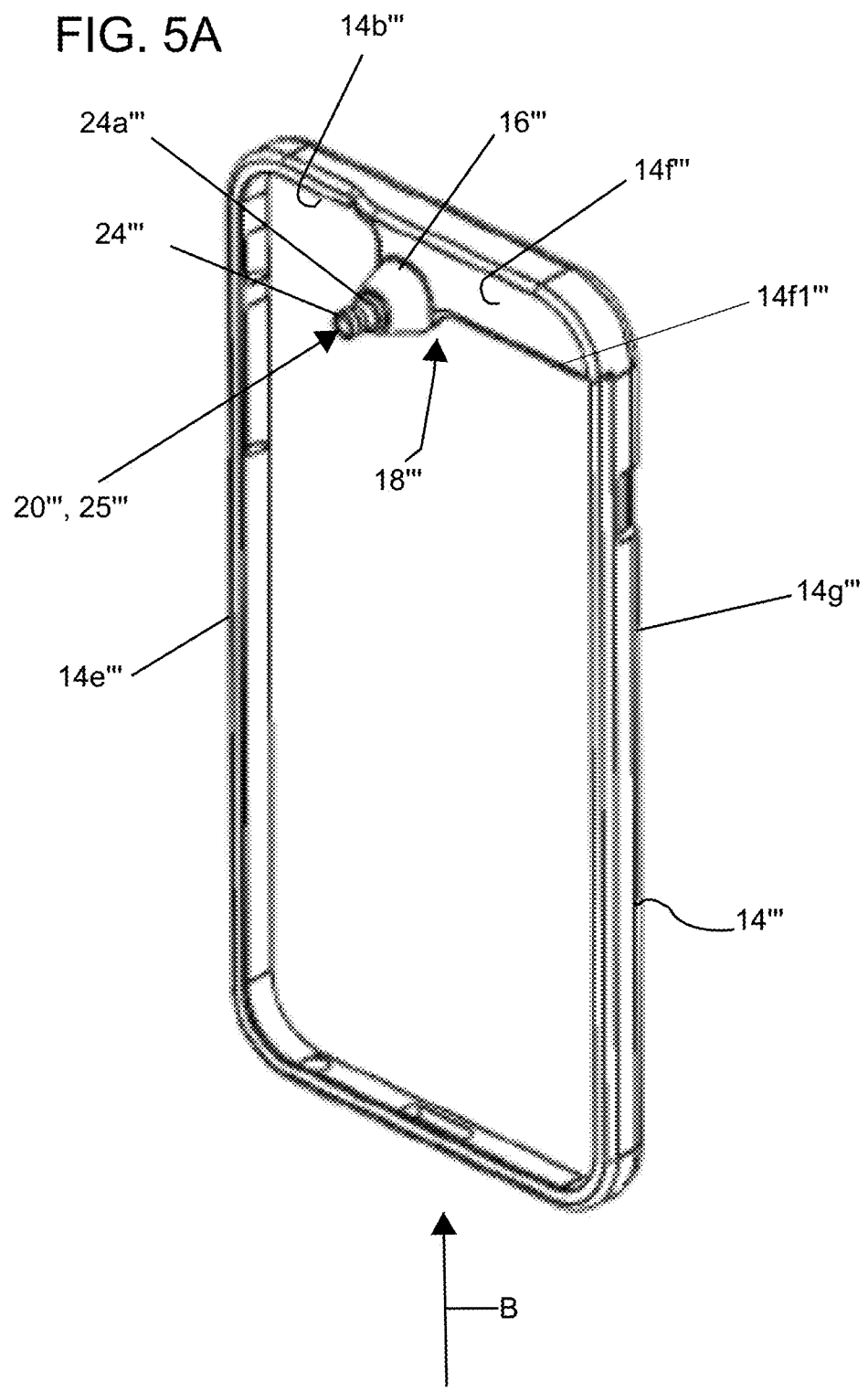

EARPIECE FOR A MOBILE DEVICE

CROSS-REFERENCE TO RELATED APPLICATION

The present application claims priority to provisional U.S. Application Ser. No. 62/422,798, filed Nov. 16, 2016, and Ser. No. 62/440,107, filed Dec. 29, 2016, to which Applicant claims the benefit of the earliest filing date. These provisional applications are incorporated herein by reference and made a part hereof.

BACKGROUND OF THE INVENTION

1. Field of the Invention

This invention relates to an earpiece for a mobile device, such as a mobile telephone.

2. Description of the Related Art

The use of mobile telephones has become ubiquitous in society. However, most phone designs do poorly at transmitting audio directly into the auditory canal of the user. Several issues contribute to this problem.

Flat handset designs provide no means to engage the external auditory canal. Additionally, mobile handsets are frequently used in noisy environments. Typical handset speakers are tiny and have low volume outputs. Separate wired or wireless headsets are cumbersome and can be lost. These problems are compounded for those with hearing loss.

Therefore, what is needed is an earpiece comprising a protuberance capable of improved apposition between the phone speaker and external ear of the user.

SUMMARY OF THE INVENTION

A primary object of the invention is to provide an earpiece for a mobile device.

Another object of the invention is to provide an earpiece that can be detachably mounted to a mobile device or a protective case for a mobile device.

Another object of the invention is to provide an earpiece that can be integrally formed in a protective case of a mobile device.

Still another object of the invention is to provide an earpiece that can use one more interchangeable earpiece tips adapted to conform to a user's ear.

Still another object of the invention is to provide an earpiece that can be detachably mounted to an end of the mobile device.

Still another object of the invention is to provide a detachable earpiece that comprises a clip or generally U-shaped construction that can be detachably mounted on the mobile device.

Still another object of the invention is to provide an earpiece having a predetermined shape, such as at least one of a generally cylindrical, bulbous, spherical, tear drop, conical, or frusto-conical.

Still another object of the invention is to provide an earpiece that is an integral, one-piece or monolithic construction.

Yet another object of the invention is to provide an earpiece having a detachable earpiece tip that can be detachably mounted on the earpiece.

Still another object of the invention is to provide an earpiece having a support or mount that is at least partially captured between a surface of a mobile device, such as a mobile telephone, and a protective case that receives the mobile device.

Yet another object of the invention is to provide an earpiece having a sound inlet that becomes operatively positioned over a speaker of a mobile device.

Another object of the invention is to provide an earpiece that is selected from a plurality of earpieces, each having a different earpiece tip that is either integrally formed therein or removably or detachably fixed to an earpiece body of the earpiece.

Another object of the invention is to provide an earpiece that has a sound exit that is coaxial with a sound entrance of the earpiece.

Still another object of the invention is to provide an earpiece tip having a sound exit that is not coaxial with the sound entrance and that is angled with respect thereto, such as at an angle of about 90°.

Another object of the invention is to provide an earpiece that is integrally or monolithically formed in a case adapted to receive a mobile device.

Another object of the invention is to provide an earpiece that is integrally or monolithically formed in a case and that is adapted to receive a removable tip.

Yet another object of the invention is to provide an earpiece that can be slidably attached to a protective case for the mobile device.

In one aspect, one embodiment of the invention comprises an earpiece for use with a mobile device, the earpiece comprising an earpiece body having a sound entrance, a sound exit and at least one internal aperture coupling the sound entrance and the sound exit, the earpiece body being adapted to be situated on or integrally formed in at least one of the mobile device or a case for the mobile device so that the sound entrance becomes operatively associated with a speaker of the mobile device so that a user can position the sound exit in or near the user's ear.

In another aspect, another embodiment of the invention comprises an earpiece for mounting on at least a portion of a mobile device, the earpiece comprising an earpiece support, and an earpiece body associated with the earpiece support, the earpiece body comprising a sound inlet, a sound outlet and at least one internal channel for acoustically coupling the sound inlet to the sound outlet, wherein the earpiece support is adapted and configured to be mounted on or formed in at least one of a portion of the mobile device, a mount for mounting on the mobile device, or a case for the mobile device so that the sound inlet becomes positioned in operative relationship with a speaker of the mobile device.

In still another aspect, another embodiment of the invention comprises an earpiece system for a mobile device comprising an earpiece, the earpiece comprising an earpiece body comprising a sound inlet, sound outlet and at least one internal channel for acoustically coupling the sound inlet to the sound outlet, the earpiece body having a first end either integrally formed or adhered to a case for the mobile device or for detachably or removeably mounting on for mobile device so that the sound inlet becomes positioned in acoustic communication with a speaker of for mobile device and a second end that defines or is adapted to receive an earpiece tip.

In another aspect, another embodiment of the invention comprises a method of placing an earpiece on a mobile device, wherein the earpiece is not fully stabilized on the mobile device, the method comprising the step of placing a handset case on the mobile device, the handset case being defined as a covering that at least partially surrounds and/or is attached to the mobile device, the placement of the handset case increasing the stabilization of the earpiece to the mobile device and resulting in the earpiece residing at least partially between the handset case and the mobile device.

In still another aspect, another embodiment of the invention comprises an earpiece for mounting on at least a portion of a mobile device, said earpiece comprising an earpiece support, and an earpiece body associated with said earpiece support, said earpiece body comprising a sound receiver for receiving a sound signal, a sound outlet, and at least one internal means for acoustically amplifying said sound signal to said sound outlet, wherein said earpiece support is adapted and configured to be mounted on or formed in at least one of a portion of said mobile device, a mount for mounting on said mobile device or a case for said mobile device so that said sound receiver can receive said sound signal, wherein said at least one internal means comprises an electronic means such as an electronic amplifier, wherein said sound receiver comprises a microphone, or means for receiving a wireless signal such as Bluetooth or a direct signal from said mobile device, a related device or a network, wherein said sound outlet comprises an electrically powered speaker, wherein said earpiece covers or surrounds a portion of said electrically powered speaker.

This invention, including all embodiments shown and described herein, could be used alone or together and/or in combination with one or more of the features covered by one or more of the following list of features:

The earpiece wherein the sound exit defines a protrusion or earpiece tip.

The earpiece wherein the protrusion or earpiece tip is at least one of angulated, beveled or offset from the sound entrance.

The earpiece wherein the protrusion or earpiece tip comprises a protrusion shape that is adapted to complement the user's ear anatomy.

The earpiece wherein the protrusion shape comprises a shape that is generally spherical, cylindrical, bulbous, generally rectangular, polygonal, elongated, curved or the like.

The earpiece wherein the protrusion or earpiece tip comprises a protrusion support post integrally formed in the earpiece body and the protrusion or earpiece tip that is removable from the earpiece body that defines a protrusion shape, the protrusion or earpiece tip being adapted to be removably mounted on the protrusion support post.

The earpiece wherein the protrusion support post is substantially perpendicular with respect to a surface of the mobile device.

The earpiece wherein the protrusion or earpiece tip is selected from a plurality of interchangeable earpiece tips, each being adapted to be removably mounted on the protrusion support post.

The earpiece wherein the mobile device is a mobile telephone, the earpiece comprising a mount adapted to permit the earpiece to be removably mounted or clipped onto the mobile device proximate to a speaker of the mobile device.

The earpiece wherein the mount is configured so that the earpiece is at least one of reversible, moveable or immobile when mounted on the mobile device.

The earpiece wherein the earpiece body comprises a mounting projection that defines a first wall on the earpiece body, the mount comprising a mating second wall on a case for the mobile device, the first and second walls cooperating to secure the earpiece to the case.

The earpiece wherein the first and second walls are beveled and define a dovetail connection.

The earpiece wherein the earpiece body comprises a mounting clip for mounting on the mobile device, the mounting clip being adapted to be situated between the mobile device and the case for the mobile device to facilitate stabilizing or holding the earpiece in a predetermined position on the mobile device.

The earpiece wherein the mounting clip is generally U-shaped and has a first wall having an aperture that defines the sound entrance.

The earpiece wherein the mounting clip is generally U-shaped and has a second wall that generally opposes the first wall and a joining portion that joins the first and second walls, the first and second walls being flexible and elastic to permit the mounting clip to retain the earpiece body in operative relationship with a speaker of the mobile device.

The earpiece wherein the mobile device comprises a first end and a speaker associated with the first end, the mounting clip being adapted and sized to engage and be mounted on the first end.

The earpiece wherein the mobile device comprises a first end, a speaker associated with the first end, and a second end that generally opposes the first end, the mounting clip being adapted and sized to engage and be mounted on the first and second ends.

The earpiece wherein the mounting clip is generally U-shaped and has a first wall that engages a first end of the mobile device, a second wall that engages a second end of the mobile device, and an elongated portion for joining the first wall and the second wall.

The earpiece wherein the earpiece body is integrally formed in a case for the mobile device.

The earpiece wherein the earpiece body is integrally formed in or affixed directly to a surface in operative relationship with a speaker of the mobile device.

The earpiece wherein the at least one internal aperture and the sound exit are configured to provide passive sound amplification.

The earpiece wherein the earpiece has an active sound amplifier.

The earpiece wherein the sound entrance defines an area that is larger than an area of the sound exit.

The earpiece wherein the earpiece body is at least one of rigid, soft or malleable to engage the user's ear and facilitate minimizing sound leakage between the user and the earpiece.

The earpiece wherein the mobile device is a mobile telephone and the earpiece comprises a mechanical mount defining a clip for mounting on the mobile device.

The earpiece wherein the earpiece body comprises at least one wing for providing support when the earpiece is mounted on the mobile device.

The earpiece wherein the earpiece body has an aperture for permitting a camera or a sensor or other feature on the mobile device to function without interference with the earpiece body.

The earpiece wherein the earpiece has at least one of an amplifier or a wireless system.

The earpiece wherein the earpiece comprises a plurality of wings for facilitating stabilization of the earpiece.

The earpiece wherein the earpiece body has a wall having an aperture that becomes aligned with a component of the mobile device when the earpiece is mounted thereon.

The earpiece wherein the earpiece body has a first end integrally formed in the case.

The earpiece wherein the earpiece body has a first end that is fastened or adhered to at least one of the case or directly on the mobile device.

The earpiece wherein the earpiece body has a first end that is fastened, adhered to or integrally formed in the earpiece support and a second end that has a predetermined shape.

The earpiece wherein the predetermined shape defines an earpiece tip that is at least one of generally cylindrical, bulbous, spherical, tear drop, conical, frusto-conical or comprises a decreasing cross section from the sound inlet to the sound outlet.

The earpiece wherein the sound outlet is coaxial with the sound inlet.

The earpiece wherein the sound outlet is offset from, angulated or not coaxial with respect to the sound inlet.

The earpiece wherein the earpiece body has a first end integrally formed or mounted on the mount, the earpiece body having an earpiece projection adapted to define or receive an earpiece tip.

The earpiece wherein the earpiece tip is selected from a group or plurality of interchangeable tips.

The earpiece wherein the group or plurality of interchangeable tips comprise different shapes or sizes adapted to fit or conform to at least a portion of a user's ear.

The earpiece wherein the earpiece support is configured and adapted to receive the mobile device.

The earpiece wherein the earpiece support comprises at least one projection defining a clip for mounting on the portion of the mobile device.

The earpiece wherein the clip is generally U-shaped.

The earpiece wherein the clip comprises a width that is substantially the same as a diameter of the earpiece.

The earpiece wherein the at least one projection comprises a first leg portion having a predetermined length, the predetermined length generally corresponding to a distance between a mounting edge of the mobile device and a speaker of the mobile device.

The earpiece wherein the at least a portion of the clip becomes situated between the mobile device and a protective case that is mounted on the mobile device after the clip and the protective case are mounted on the mobile device.

The earpiece wherein the clip comprises a first end having a generally U-shape defining an aperture for receiving at least a portion of the mobile device, a second end for engaging an end of the mobile device and an elongated joining portion for joining the first and second ends, the earpiece being associated with the first end.

The earpiece wherein the case comprises a protective case, the earpiece support of the earpiece comprises a portion that is integrally formed in the protective case adapted to be mounted on at least a portion of the mobile device.

The earpiece wherein the protective case covers a majority of the mobile device.

The earpiece wherein the protective earpiece is mounted on the mobile device and covers less than a majority of the mobile device.

The earpiece wherein the sound inlet defines an aperture that is larger than an aperture defined by the sound outlet.

The earpiece wherein the earpiece body is frusto-conical in cross section.

The earpiece wherein the case comprises a protective case, the earpiece support comprises a mount for mounting the earpiece on the protective case.

The earpiece wherein the mount defines a connection comprising at least one beveled wall that defines a mounting area on the case, the earpiece support having a generally planar portion comprising at least beveled surface adapted to mate with the at least one beveled wall so that the earpiece support can be removably mounted on the case.

The earpiece wherein the at least one beveled wall and the at least one beveled surface defines a dovetail connection.

The earpiece wherein the mobile device is a mobile telephone.

The earpiece wherein the earpiece support comprises a mounting clip, the earpiece body having a first end integrally formed or mounted on the mounting clip and a second end that defines or is adapted to receive an earpiece tip.

The earpiece system wherein the earpiece system comprises a plurality of the earpieces.

The earpiece system wherein the plurality of the earpieces each has an earpiece tip having a predetermined shape, at least two of which are different.

The earpiece system wherein the predetermined shape is at least one of generally cylindrical, bulbous, spherical, tear drop, conical, frusto-conical or comprises a decreasing cross section from the sound inlet to the sound outlet.

The earpiece system wherein the sound outlet is coaxial with the sound inlet.

The earpiece system wherein the sound outlet is not coaxial with the sound inlet.

The earpiece system wherein the earpiece body has a first end integrally formed or adapted to be mounted on the case, the earpiece body having an earpiece projection adapted to receive an earpiece tip.

The earpiece system wherein the earpiece tip is selected from a group or plurality of interchangeable tips.

The earpiece system wherein the group or plurality of interchangeable tips comprise different shapes or sizes adapted to fit or conform to at least a portion of a user's ear.

The earpiece system wherein the earpiece body has an end that is configured and adapted to be mounted directly onto the mobile device.

The earpiece system wherein the first end defines a clip for mounting on a the portion of the mobile device.

The earpiece system wherein the clip is generally U-shaped.

The earpiece system wherein the clip comprises a width that is substantially the same as a diameter of the earpiece.

The earpiece system wherein the clip comprises a first leg portion having a predetermined length, the predetermined length generally corresponding to a distance between a mounting edge of the mobile device and a speaker of the mobile device.

The earpiece system wherein the at least a portion of the clip becomes situated between the mobile device and the case that is mounted on the mobile device after the clip and the case are mounted on the mobile device.

The earpiece system wherein the clip comprises a first end having a generally U-shape defining an aperture for receiving at least a portion of the mobile device, a second end for engaging an end of the mobile device and an elongated joining portion for joining the first and second ends, the earpiece being associated with the first end.

The earpiece system wherein the first end of the earpiece body comprises a portion that is integrally formed in the case adapted to be mounted on at least a portion of the mobile device.

The earpiece system wherein the case covers a majority of the mobile device.

The earpiece system wherein the case is mounted on the mobile device and covers less than a majority of the mobile device.

The earpiece system wherein the sound inlet defines an aperture that is larger than an aperture defined by the sound outlet.

The earpiece system wherein the earpiece body is frusto-conical in cross section.

The earpiece system wherein the earpiece body has a portion that is generally planar and comprises at least one first wall adapted to mate with at least one second wall in the case so that the earpiece can be detachably mounted to the mobile device case.

The earpiece system wherein the at least one first and second walls have mating beveled surfaces that cooperate to define a dovetail connection.

The earpiece system wherein the mobile device is a mobile telephone.

The earpiece system wherein the first end is mounted directly over the speaker.

The earpiece system wherein the first end is mounted directly over a speaker aperture in the case.

These and other objects and advantages of the invention will be apparent from the following description, the accompanying drawings and the appended claims.

BRIEF DESCRIPTION OF THE
ACCOMPANYING DRAWINGS

FIGS. 1A-1D illustrate a first embodiment showing an earpiece having a removable tip and detachably mounted to a mobile device, such as a mobile telephone;

FIGS. 5A-5E are illustrations similar to the embodiment shown in FIGS. 4A-4E, except that the earpiece tip is removable and the case has an elongated support;

DETAILED DESCRIPTION OF THE
PREFERRED EMBODIMENTS

Referring now to FIGS. 1A-13, an earpiece 10 is shown. In the embodiment of FIGS. 1A-1D, the earpiece 10 is removably or detachably mounted on a mobile device 12. The mobile device 12 may be a mobile telephone, mobile viewing device or a listening device or other smart device. For example, the mobile device 12 may be an iPhone, iPod or iPad available from Apple Computers of Cupertino, Calif., a Samsung Galaxy device available from Samsung of America, an LG phone device available from LG Electronics Mobilecomm USA of San Diego, a Moto Z Droid device available from Motorola Mobility LLC of Chicago, Ill., or a Pixel device available from Google of Mountain View, Calif. Of course, it should be understood that this is not an exhaustive list of all mobile devices that the embodiments can be used with, and other devices from other manufacturers may be used as well. For ease of illustration the mobile device 12 will be shown and described by reference to a mobile telephone.

Figure 7A:
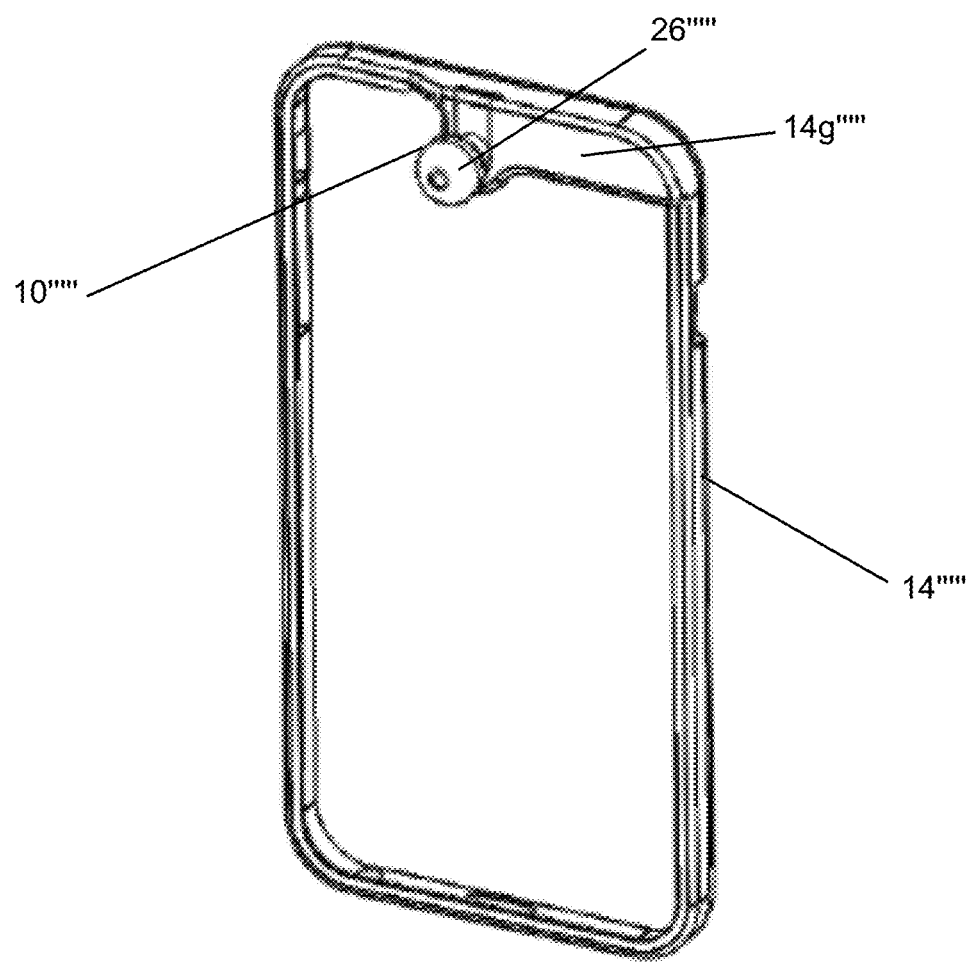
FIGS. 7A-7C illustrate an earpiece that is detachably removed from the earpiece case using a dovetail connection joint.
Figure 7B:
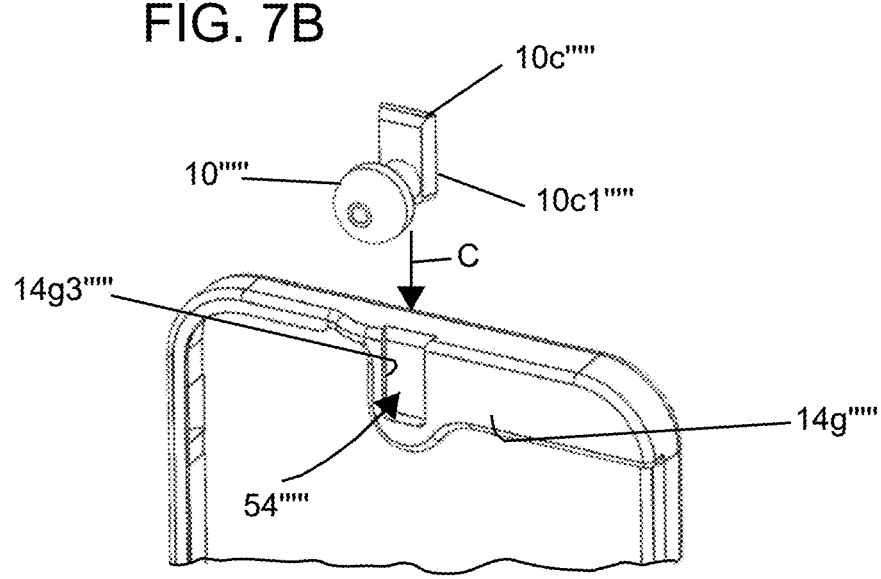
Figure 7C:
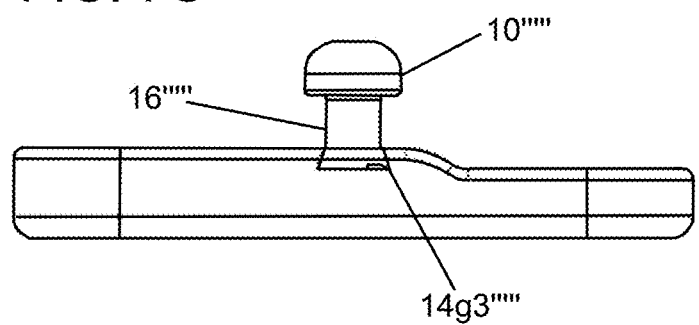
Figure 8A:
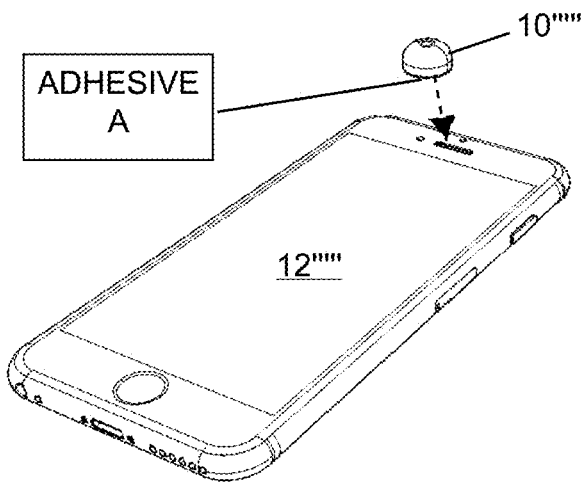
FIGS. 8A-8B illustrate another embodiment similar to the embodiment shown in FIG. 6A except that the earpiece is mounted directly to the mobile device.
Figure 8B:
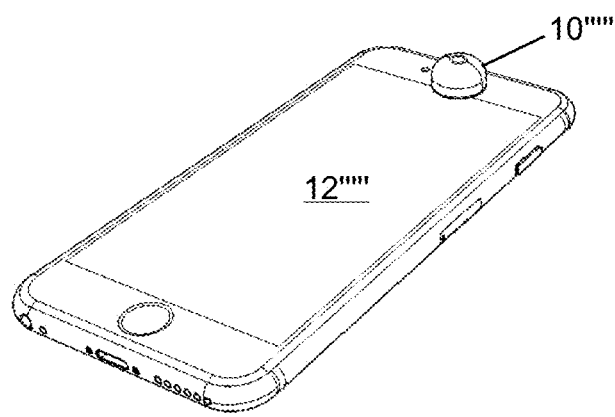
Figure 11:
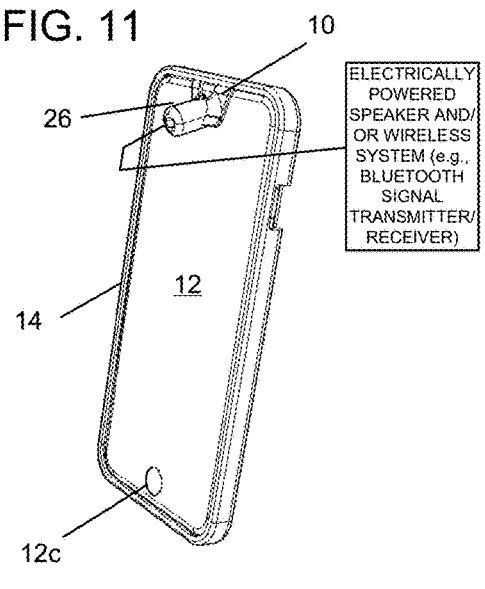
FIG. 11 is a perspective view of the embodiment shown in FIG. 10 showing wings for mounting on the mobile device.
Figure 12:
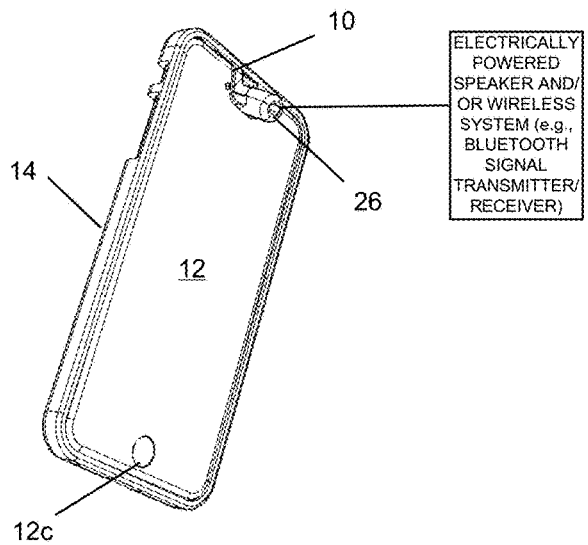
FIG. 12 is another perspective view of the embodiment shown in FIG. 10 mounted on the mobile device.
Figure 13:
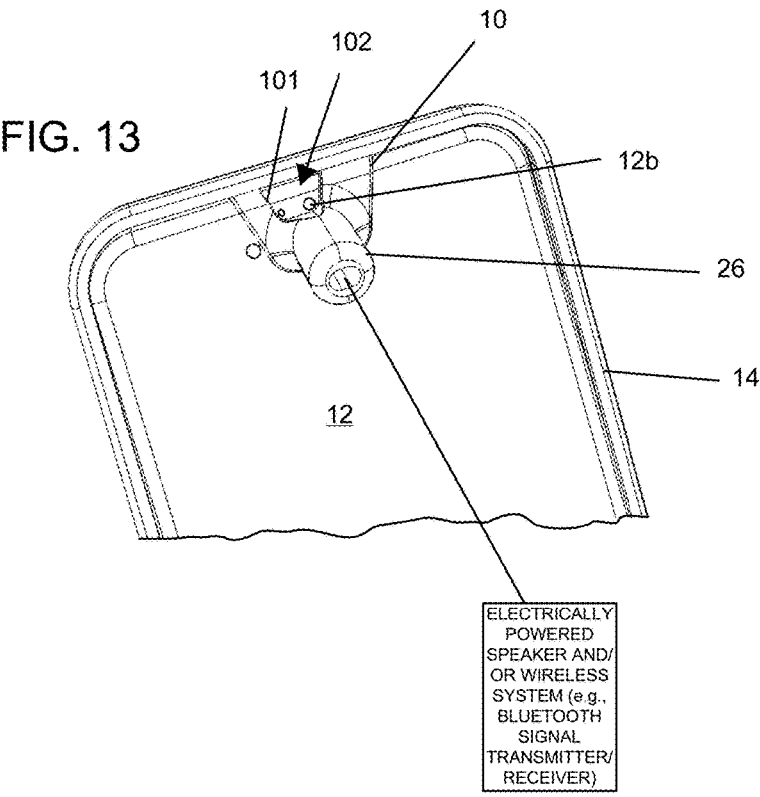
FIG. 13 is a view showing an earpiece body having an aperture that is adapted and sized to permit features of the mobile device, such as a camera or sensor, to be used after the earpiece is mounted on the mobile device.

The mobile device 12 comprises a speaker 12a, a camera lens 12b, and a button 12c of the type that is conventionally known. A feature of the embodiments being described is that the earpiece 10 is adapted and configured to transmit audio directly from the speaker 12a into an auditory canal of a user. In the illustration being described in FIGS. 1A-1D and 2A-2H, for example, the earpiece 10 is adapted to be removably mounted or secured to the mobile device 12. As will be described in more detail later herein, FIGS. 3A-3C illustrate an embodiment where the earpiece 10 is sized and adapted so that a protective case 14 can receive both the mobile device 12 and at least a portion of the earpiece 10. Alternatively and as described later herein relative to the embodiment shown in FIGS. 5A-6B, the earpiece 10 may be integrally or monolithically formed as part of the case 14 as shown. FIGS. 7A-7C illustrates an embodiment wherein the earpiece 10 is removably secured to the case 14, and FIGS. 8A-8B show the earpiece 10 mounted directly to the mobile device 12. FIGS. 11-13 show another earpiece embodiment. These various embodiments are shown in the figures and will be described in more detail later herein.

Figure 1A:
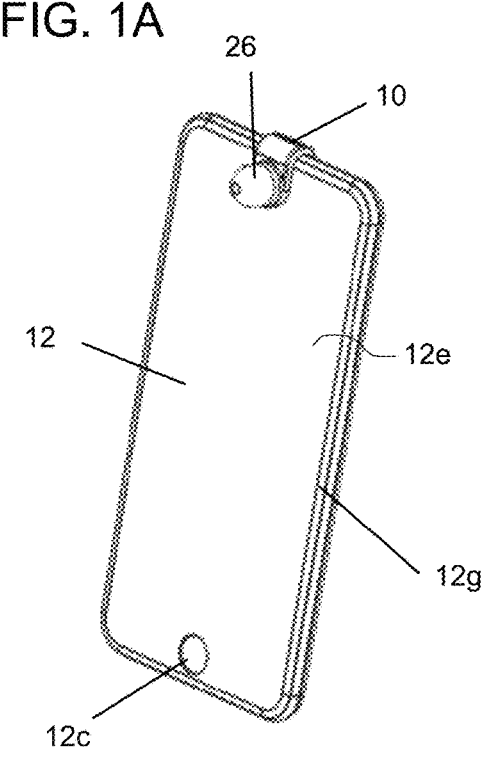
Figure 1B:
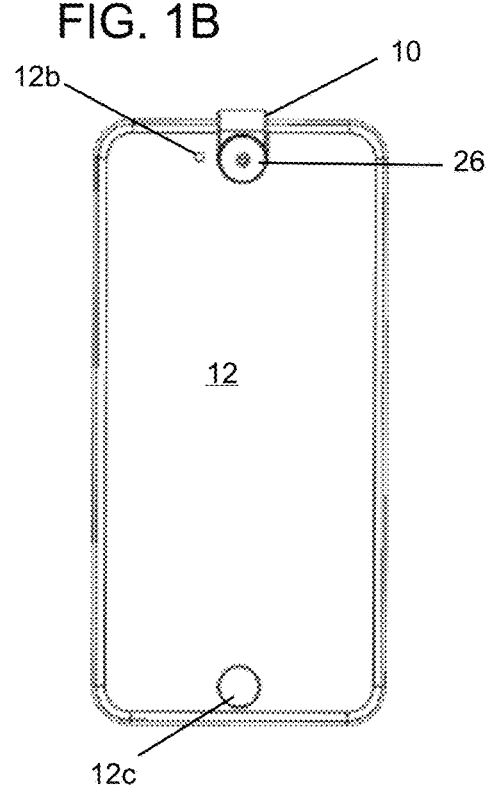
Figure 1C:
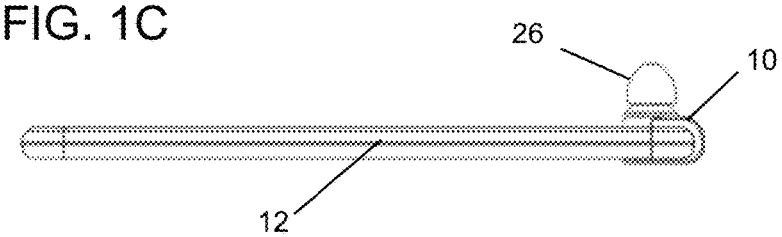

Returning back to the initial embodiment shown in FIGS. 1A-1D, the mobile device 12 comprises the speaker 12a associated with a first end 12d. A user moves the earpiece 10 in the direction of arrow A in FIG. 1D and mounts the earpiece 10 on a first end 12d of the mobile device 12 until the earpiece 10 is situated in operative relationship with the speaker 12a. FIG. 1A is a perspective view and FIG. 1B is a front view of the mobile device 12 with the earpiece 10 mounted on the mobile device 12.

Figure 2A:
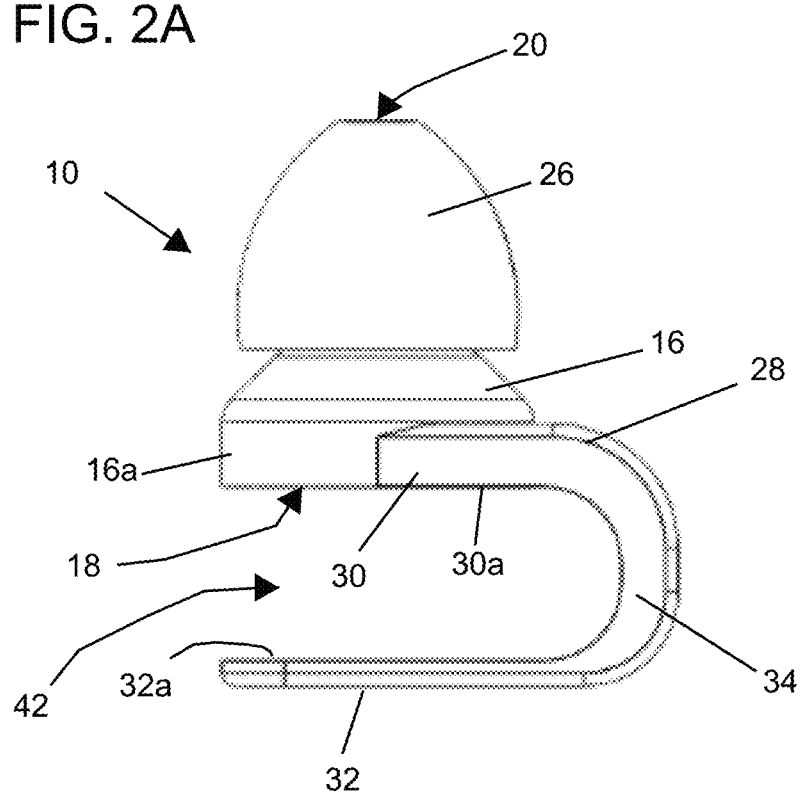
FIGS. 2A-2E illustrate an embodiment showing an earpiece with a removable earpiece tip and a generally U-shaped mount or clip.
Figure 2B:
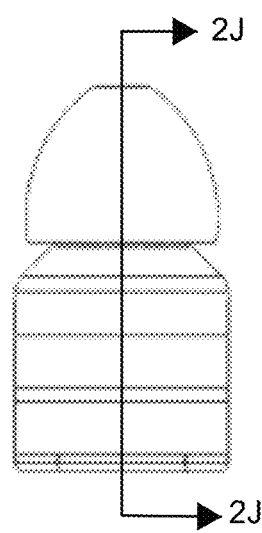

FIGS. 2A-2D illustrate various features of the earpiece 10 which will now be described. As best illustrated in FIG. 2A, the earpiece 10 comprises an earpiece body 16 having a first wall 11 (FIG. 2I) that defines a sound entrance 18 and a second wall 13 (FIG. 2J) that defines a sound exit 20. As illustrated in the embodiment shown in FIGS. 2C, 2D, 2I and 2J, the earpiece 10 comprises the first wall 11 and the second wall 13 that define at least one or a plurality of internal acoustic apertures or channels 22 that acoustically couple the sound entrance 18 to the sound exit 20 as illustrated in FIG. 2J. As illustrated in FIG. 2I, note that the first wall 11 is generally oval in shape and has a dimension that is generally larger than the speaker 12a so that the sound entrance 18 completely surrounds the speaker 12a. The sound entrance 18 could be other shapes, such as circular, square or multi-sided.

It should be understood that the earpiece body 16 is adapted to be situated on, adhered to or integrally formed in at least one of the mobile device 12, a mount 28 or earpiece support, such as a clip described later herein, or the case 14 for the mobile device 12 so that the sound entrance 18 becomes operatively associated and positioned in generally opposed relation to the speaker 12a of the mobile device 12. This enables the user to position the sound exit 20 in or near the user's outer ear (not shown) while holding the mobile device 12. It should be understood that in all embodiments being described, the earpiece 10 has at least one internal passageway or channel that provides an acoustic coupling between the speaker 12a of the mobile device 12 and the user's ear, thereby improving the volume, quality and clarity of the sound received by the user.

In the embodiment of FIGS. 2A-2J, the earpiece body 16 comprises a protrusion post 24 that defines a support post for receiving an earpiece tip or body 26 having a predetermined shape that is adapted to be received in the user's ear. The earpiece tip or body 26 may be selected from a group or plurality of earpiece tips that comprise a plurality of different shapes or sizes and configurations that are adapted to complement the user's ear anatomy. In some of the embodiments shown and described later herein relative to FIGS. 2F and 4A-4E, the earpiece tip or body 26 is integrally formed in the earpiece body 16. The group or plurality of earpiece tips comprise different shapes or sizes and are adapted to fit or conform to at least a portion of the user's ear. The earpiece tip or body 26 has a predetermined shape that may be at least one of a generally cylindrical, bulbous, spherical, tear drop, conical, frusto-conical or comprise a decreasing cross section from the sound entrance 18 to the sound exit 20 as shown in the different embodiments in FIG. 2F.

Figure 2C:
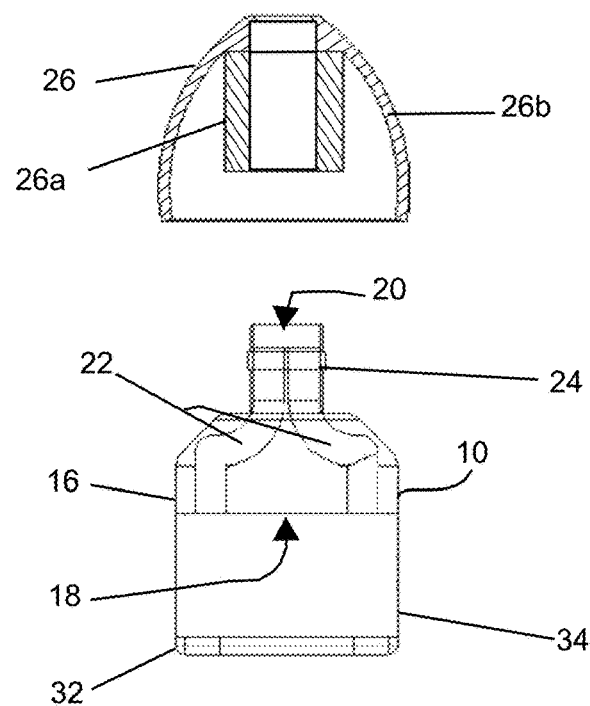
Figure 2D:
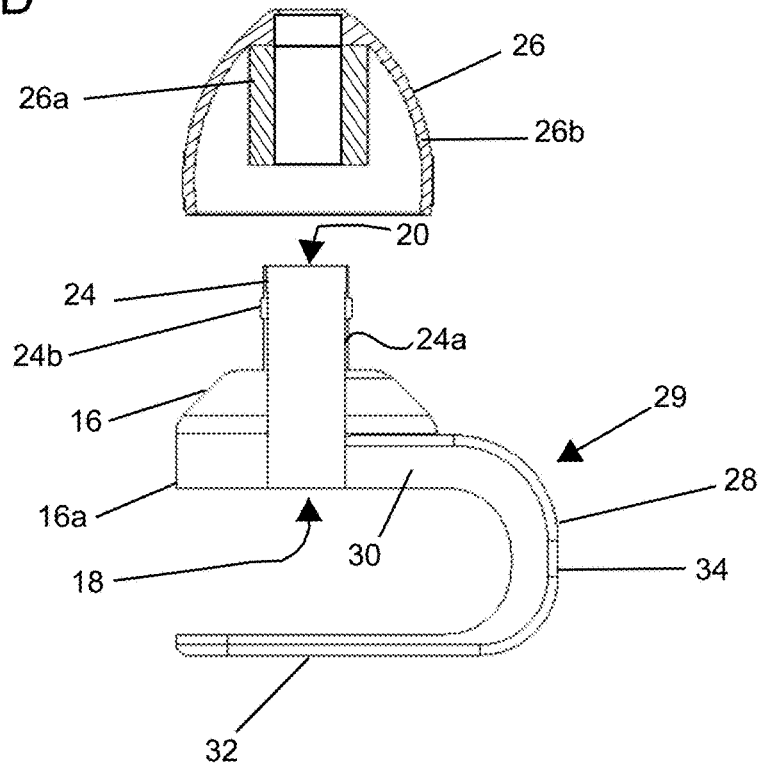
Figure 2E:
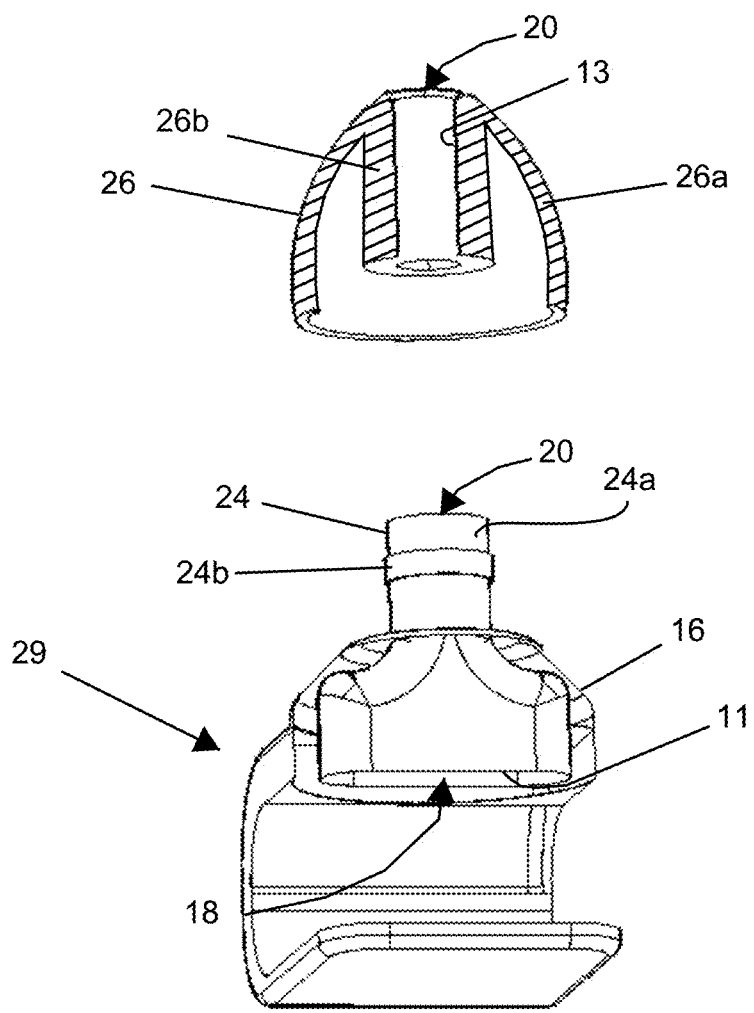
Figure 3A:
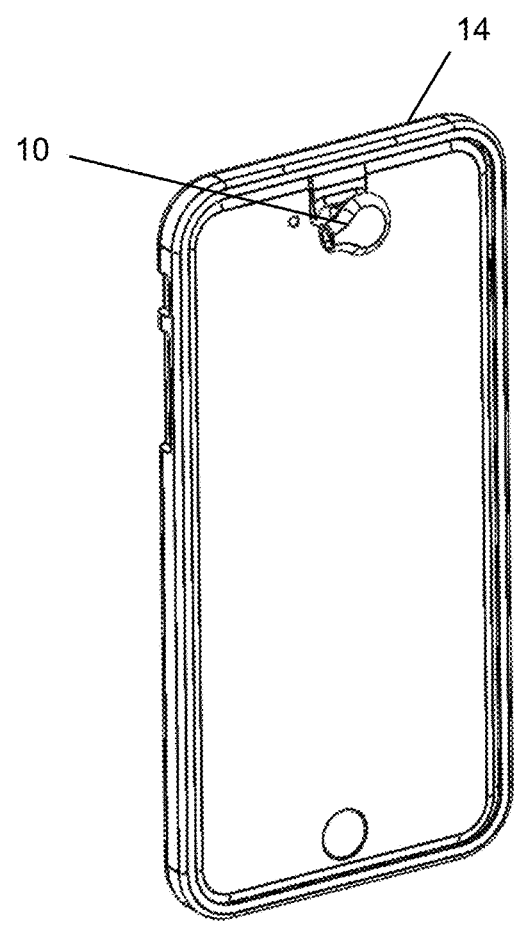
FIGS. 3A-3C illustrate an embodiment where the earpiece is sized and adapted so that a protective case can receive both the mobile device and at least a portion of the earpiece.
Figure 3B:
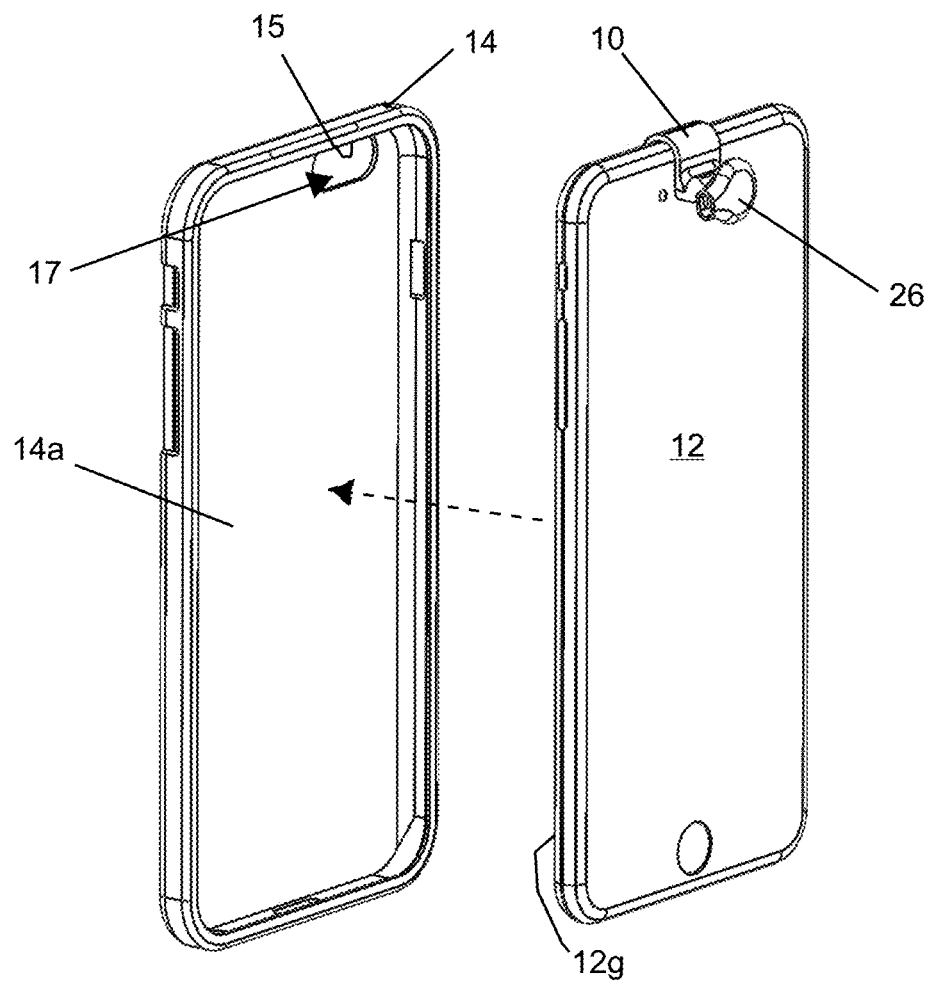
Figure 3C:
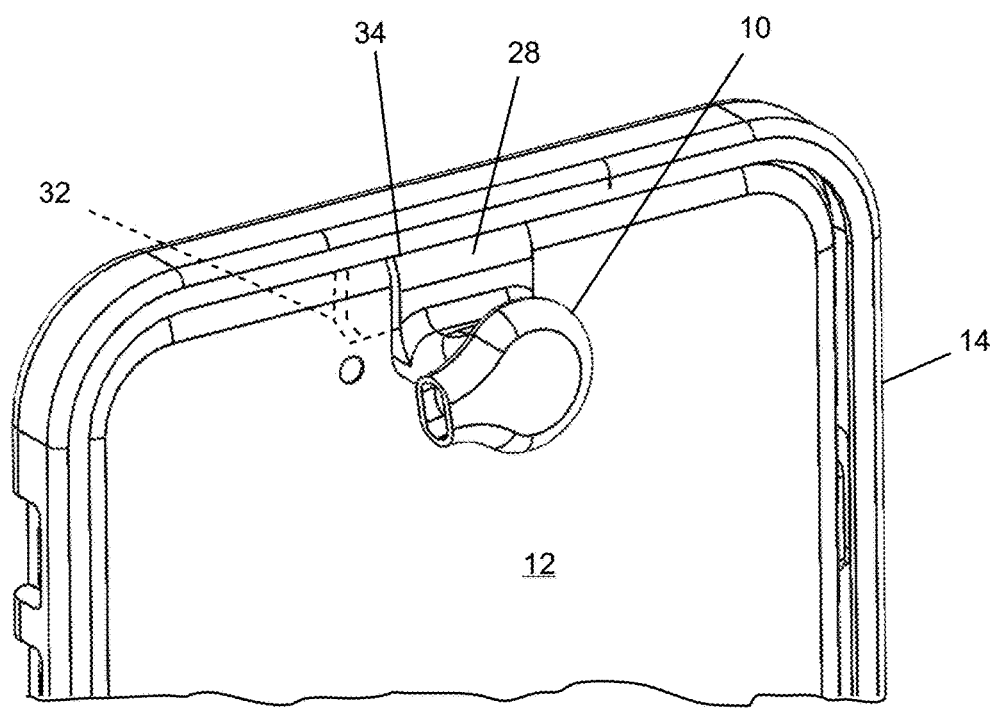

Alternatively and as illustrated in FIGS. 2C and 2D, the earpiece tip or body 26 may be a separate component that is mounted onto the protrusion post 24. As shown in FIGS. 2C-2E, the protrusion post 24 defines generally cylindrical walls 24a, 24b and the earpiece tip or body 26 comprises the interior cylindrical wall 13 that defines the sound exit 20 having a diameter adapted to receive the protrusion post 24 as shown. In this regard, the earpiece tip or body 26 may be made of an elastic or polymeric material, such as silicone or rubber that is flexible and elastic and that can be press fit onto the protrusion post 24. The earpiece tip or body 26 may be soft and flexible, or even a foam material, so that it can be received and conform to a shape of either the user's outer ear or inner ear canal. Note that the earpiece tip or body 26 in the embodiment of FIG. 2C is generally elliptical or frusto-conical in cross-section and has an outer wall 26b that defines the generally elliptical or frusto-conical shape, with the generally cylindrical wall 26a integrally or monolithically formed therein.

The earpiece 10 comprises a mount 28 (FIGS. 2A and 2D) having at least one earpiece support or projection 29 that extends from the earpiece body 16. The mount 28 is adapted to secure the earpiece 10 onto the mobile device 12. The mount 28 of the earpiece body 16 has a first leg portion 30, a second leg portion 32, and a joining portion 34 which joins the first leg portion 30 and second leg portion 32 as illustrated in FIG. 2A. A bottom portion 16a of the earpiece body 16 is integrally formed in the first leg portion 30 of the mount 28. In the illustration, the mount 28 defines a generally U-shaped clip. The mount 28 is elastic and flexible so that the second leg portion 32 can move toward and away from the first leg portion 30 when the earpiece 10 is mounted on the mobile device 12. In this regard, the earpiece body 16, the first leg portion 30, the second leg portion 32 and the joining portion 34 are all a monolithic and integral construction and made from a polymeric material, such as acrylonitrile butadiene styrene (ABS), polyvinyl chloride (PVC), or polycarbonate.

The mount 28 is adapted to permit the earpiece 10 to be removably mounted or clipped onto the mobile device 12 so that the sound entrance 18 becomes situated over or near the speaker 12a of the mobile device 12. Once the earpiece 10 is mounted on the mobile device 12, note that the protrusion post 24 is substantially perpendicular to a surface 12e (FIG. 1D) of the mobile device 12, as illustrated in FIGS. 1A and 1D.

Figure 2F:
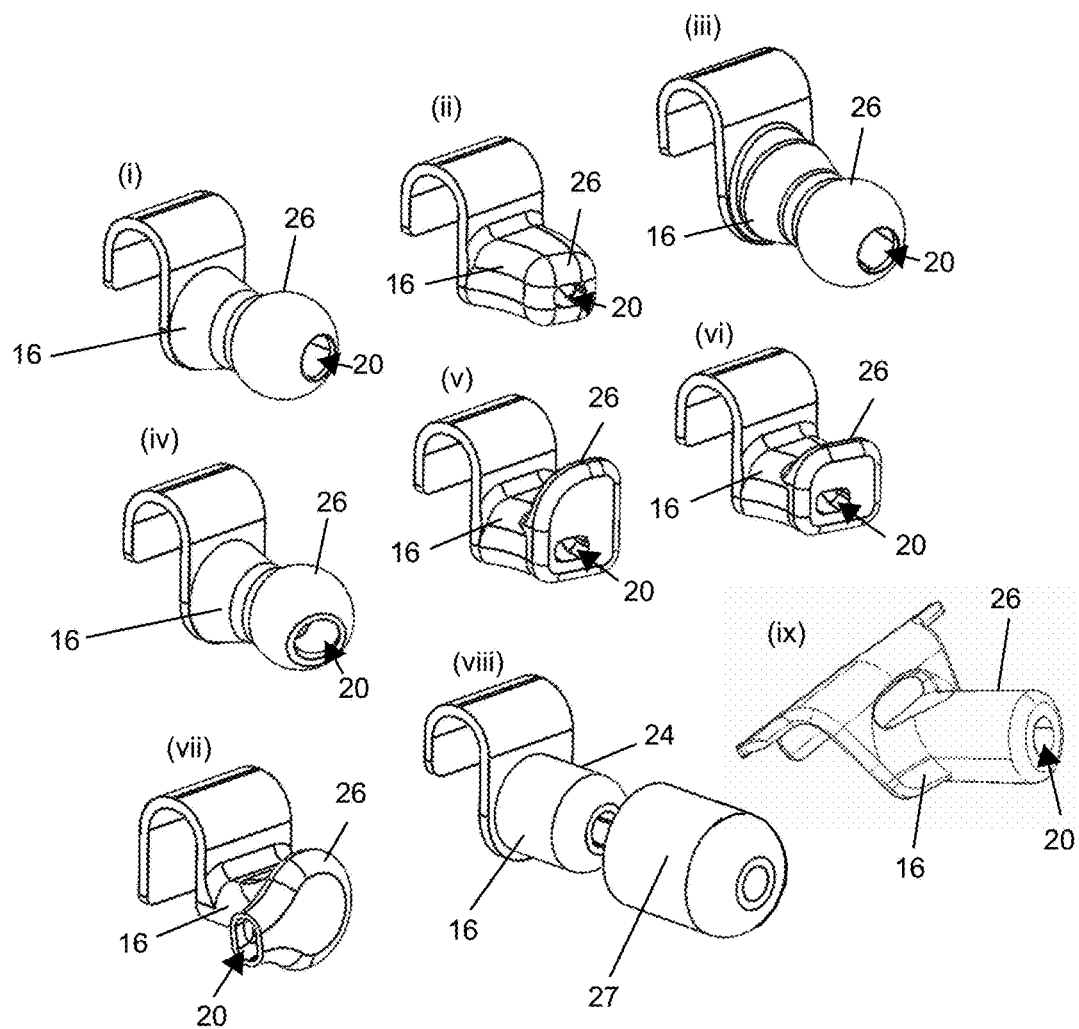
FIG. 2F illustrates various embodiments of detachable earpieces that may be detachably mounted to a mobile device, with those embodiments shown in FIGS. 2F(i)-2F (vii) showing integral one-piece constructions having earpiece bodies and tips of different configurations and FIG. 2F(viii) showing a detachable earpiece tip.

As mentioned earlier, it should be understood that a plurality of earpieces 10 may be provided a plurality of different configurations as illustrated in FIG. 2F and the views shown and labeled 2F(i)-2F(ix). The embodiments of the earpieces 10 in FIG. 2F show different types of integrally formed shapes, such as a generally cylindrical, bulbous, spherical, tear drop, conical, frusto-conical or the like and comprise a decreasing cross section from the sound entrance 18 to the sound exit 20. In the embodiment of FIG. 2F(i), the protrusion post 24 is generally cylindrical and elongated and receives a separately mounted generally elongated and cylindrical earpiece tip or body 27 as shown. Note that the earpiece tips or bodies 26 are integrally formed in the earpiece body 16 in each of the embodiments of FIGS. 2F(i)-2F(vii) and each earpiece body 16 comprises the sound entrance 18, sound exit 20 and the acoustic apertures or channels 22 illustrated relative to the embodiment in FIGS. 2A-2D.

Figure 2G:
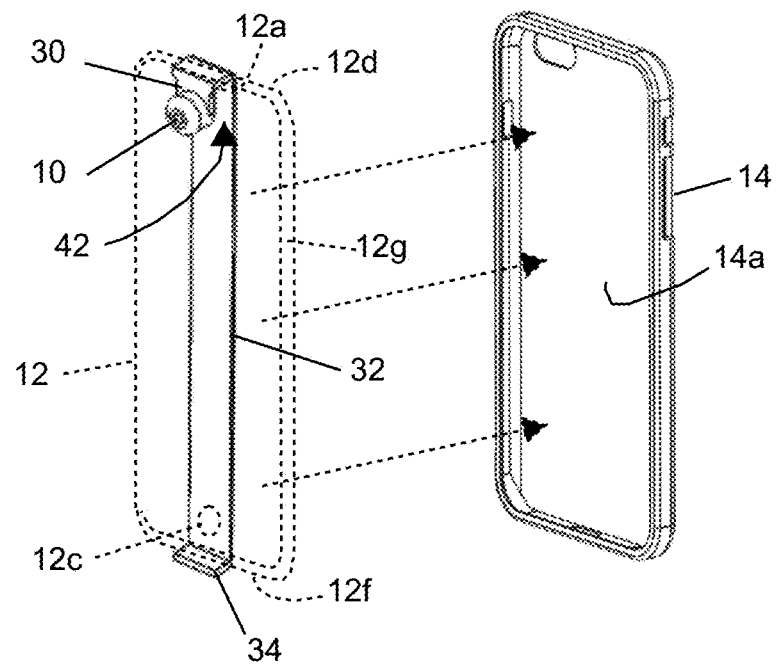
FIG. 2G is an illustration showing an elongated clip for facilitating securing and mounting the earpiece to the mobile device and having at least a portion that is captured or trapped between a surface of the mobile device and a protective case for the mobile device.
Figure 2H:
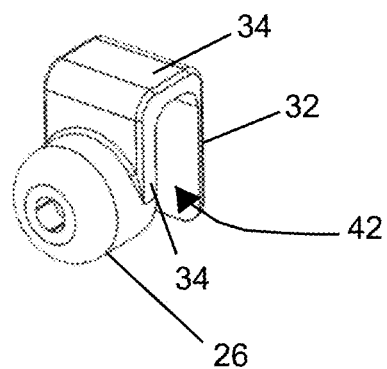
FIG. 2H is another embodiment showing an integral earpiece and tip.
Figure 2I:
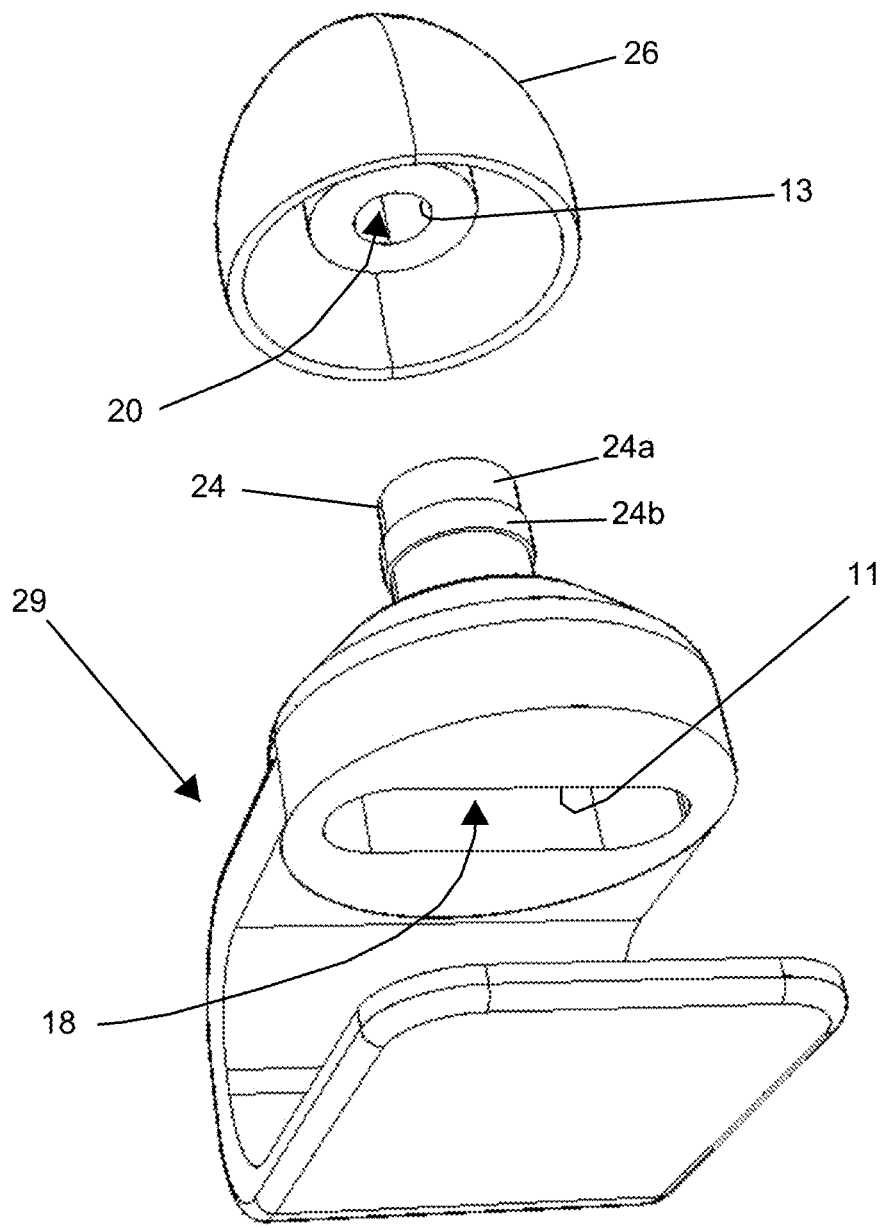
FIGS. 2I-2J are further details of the embodiment shown in FIGS. 2A-2E.
Figure 2J:
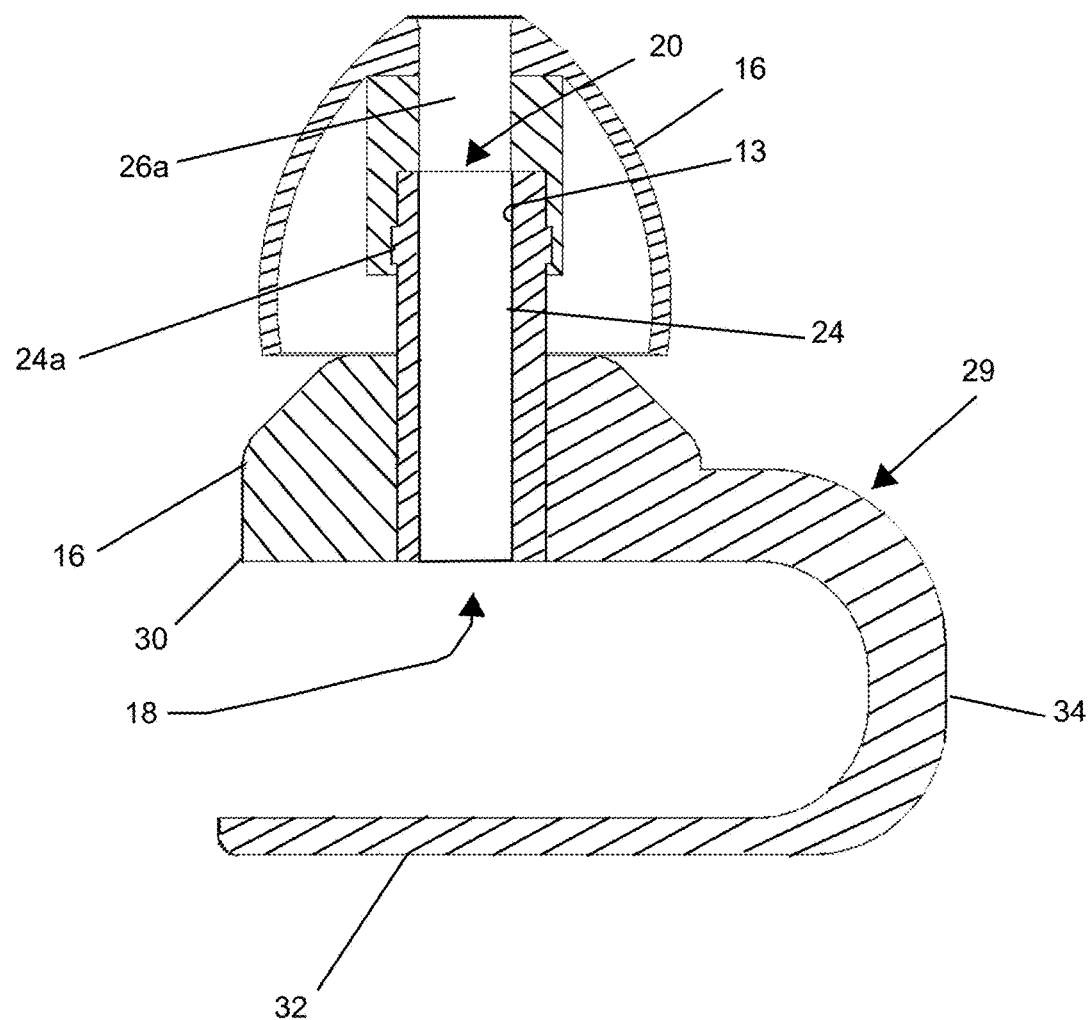

FIG. 2G shows a similar embodiment illustrating an earpiece tip or body 26 that is integrally or monolithically formed with the first leg portion 30.

As mentioned earlier, the first leg portion 30, second leg portion 32 and joining portion 34 define a generally U-shape and they cooperate to define an aperture 42 (FIGS. 2G and 2H) adapted and sized to receive the first end 12d of the mobile device 12. To further facilitate immobilization of the earpiece 10 on the mobile device 12, the embodiment in FIG. 2G shows the second leg portion 32 being elongated with a generally L-shaped projection or portion 34 that engages a bottom or end 12*f* of the mobile device 12 after the first end 12*d* of the mobile device 12 has been received in the aperture 42. As with the embodiment shown in FIGS. 3A-3C, the earpiece 10 of FIG. 2G may be mounted on the mobile device 12 and then the protective case 14 situated on the mobile device 12. This enables the second leg portion 32 to be captured or trapped between a surface 14*a* of the case 14 and a wall 12*g* of the mobile device 12, thereby further immobilizing the earpiece 10 after it is mounted in acoustic communication with the speaker 12*a* of the mobile device 12.

In the embodiments of FIGS. 2A-2D, 2F(viii) and FIGS. 5A-5E, the earpiece tip or body 26 is detachably mounted to the protrusion post 24. The earpiece tip or body 26 may be provided in a kit, storage container or package in which a plurality of interchangeable earpiece tips or bodies 26 are provided. The plurality of interchangeable earpiece tips or bodies 26 may be the same shape and size or they could be different shapes, sizes or configurations which may enable the user or other person, such as a doctor, to select an earpiece tip or body 26 that is shaped and sized to accommodate an anatomy of the user's outer or inner ear. It is contemplated that the earpiece tip or body 26 may be replaced by the user over time.

Note that the mount 28 on the earpiece 10 is generally U-shaped to conform to the shape of the end 12*d* of the mobile device 12 to enable the earpiece 10 to be mounted on the mobile device 12. In several embodiments, the earpiece 10 can be clipped onto the end 12*d* of the mobile device 12 and proximate to the speaker 12*a* of the mobile device 12. In one embodiment, the mount 28 is configured so that the earpiece 10 can be removably mounted and is at least one of reversible, movable or immobile when mounted on the mobile device 12. In other words, the earpiece 10 can be temporarily removed from the mobile device 12 and replaced when needed. Preferably, the earpiece 10 is immobile after it is mounted on the mobile device 12. In this regard, either or both of an inner surface 30*a* (FIG. 2A) of the first leg portion 30 or an inner surface 32*a* of the second leg portion 32 may be processed, coated or treated to have a surface adapted to grip the surfaces of the mobile device 12, such as the surface 12*e* (FIG. 1D). For example, the inner surfaces 30*a* and 32*a* could be serrated, coated, rubberized or comprise an adhesive A (FIGS. 6A and 8A) that facilitates affixing or retaining the earpiece 10 to the mobile device 12.

FIGS. 3A-3C illustrate another embodiment wherein at least a portion of the earpiece 10 is sandwiched between the mobile device 12 and its case 14 as illustrated in FIG. 3A. FIG. 3C shows a similar immobilization using the earpiece 10 shown in FIG. 2F(viii). By fixing the earpiece 10 to the mobile device 12 and then mounting the case 14 on the mobile device 12, the second leg portion 32 becomes secured and sandwiched between the mobile device 12 and case 14, thereby causing the earpiece 10 to become fixed and immobilized. Thus, in the exploded fragmentary view of FIG. 3A, the mount 28 and, particularly, at least a portion of the joining portion 34 and the second leg portion 32 become captured between the mobile device 12 and the case 14, thereby stabilizing and fixing the earpiece 10 in place so that the sound entrance is directly over the speaker 12*a* of the mobile device 12 as shown. Note in this embodiment that the earpiece tip or body 26 is teardrop shaped and the exit aperture extends generally perpendicular to the sound entrance 18, which is situated over the speaker 12*a*. In this example, the earpiece tip or body 26 is integrally formed in the earpiece body 16.

It should be understood that the case 14 may have one or more internal walls 15 that define apertures 17 that become aligned with various components on the mobile device 12, such as cameras, lenses and the like.

FIGS. 4A-8B illustrate other embodiments that will now be described. In these embodiments, the same parts are identified with the same part numbers, except that one or more prime ("'") mark(s) have been added to these part numbers for the different embodiments.

Referring now to FIGS. 4A-4E, a single-piece embodiment is shown. In this embodiment, the earpiece 10' is integrally or monolithically formed in the case 14' as shown. In this embodiment, the earpiece tip or body 26' is also integrally or monolithically formed as part of the earpiece 10'. In this regard, note that the case 14' comprises a case support or projection 40' that has a first end 40*a*' integrally formed in a wall 14*b*' of the case 14'. An earpiece tip or body 26' is integrally formed in a second end 40*b*' of the case support or projection 40'. As with the embodiment described earlier herein, the earpiece 10' may comprise a detachable earpiece tip or body 26' similar to the embodiment shown and described relative to FIG. 2C, and this embodiment is shown and described later herein relative to FIGS. 5A-5E.

Figure 4A:
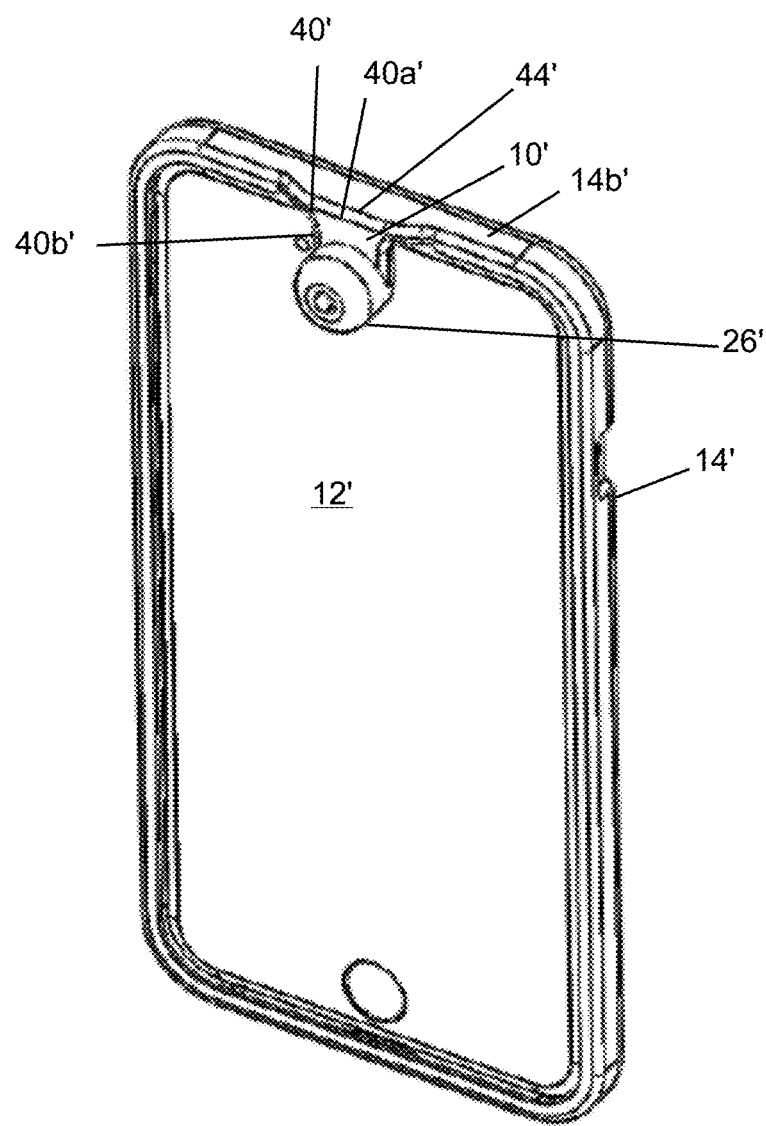
FIGS. 4A-4E illustrate an earpiece integrally formed in a protective case for the mobile device.
Figure 4B:
Figure 4C:
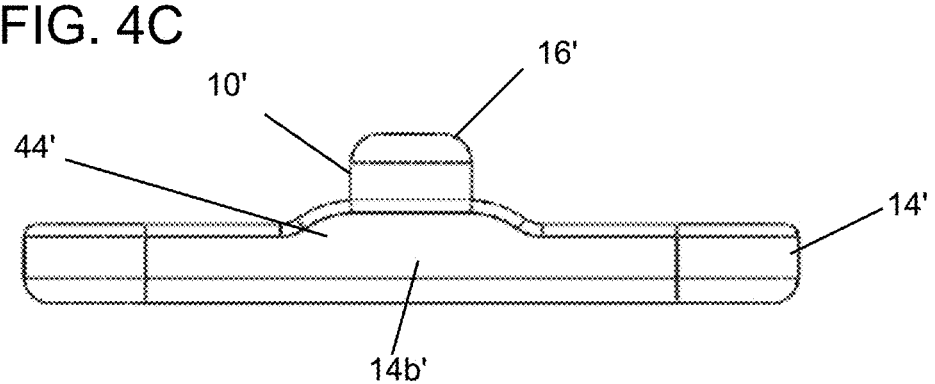
Figure 4D:
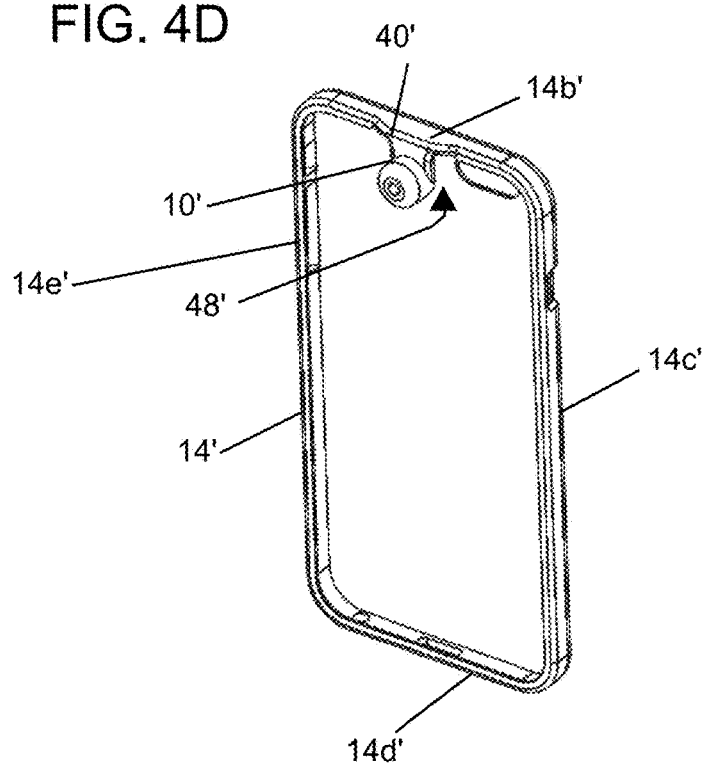

FIG. 4C is a plan or top view of the device showing features of the earpiece tip or body 26' and earpiece 10' of the embodiment shown in FIG. 4A. In this embodiment, the wall 14*b*' extends upward (as viewed in FIG. 4C), case projection 40' extends generally perpendicular to this wall 14*b*' as best illustrated in FIG. 4D. Again, in this embodiment, the U-shaped portion 44' and case projection 40' are integrally formed in the wall 14*b*'.

FIG. 4D illustrates the protective case 14' without the mobile device 12' mounted therein. Note that the case projection 40' cooperates with the wall 14*b*' and the surface 14*a*' to define a receiving area 48' that is adapted to receive the end 12*d*' of the mobile device 12'. The case projection 40' and earpiece 10' are operatively positioned or located such that the sound entrance 18' of the earpiece 10' becomes situated over the speaker 12*a*'. In this regard, the earpiece 10' may be configured differently or oriented in different positions on the case 14', such as on the other walls 14*c*', 14*d*' or 14*e*'. Also, the case projection 40' may be longer or shorter or positioned off center so that when the mobile device 12' is mounted in the case 14', the sound entrance 18' of the earpiece 10' becomes oriented and positioned in generally opposed relationship to the speaker 12*a*'.

Figure 4E:
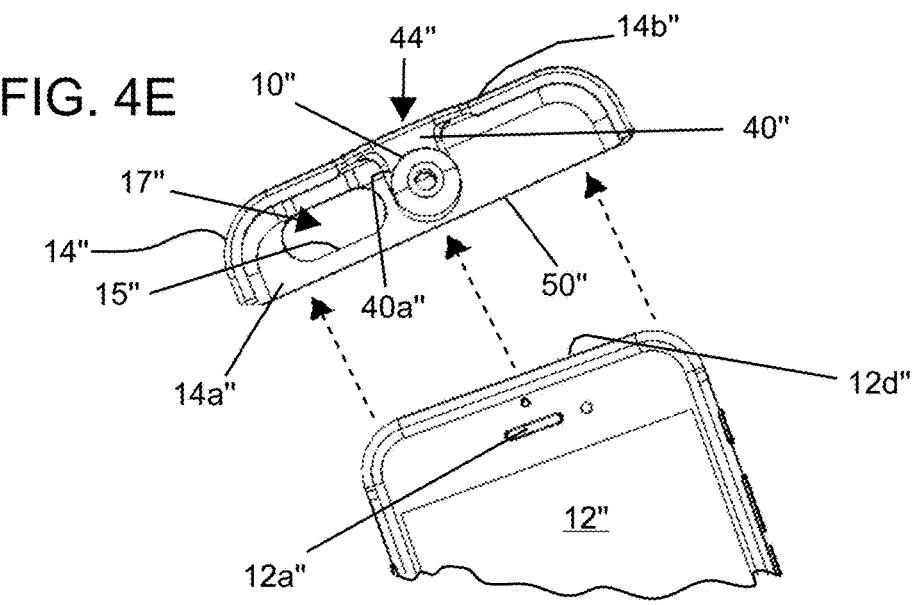

FIG. 4E illustrates yet another embodiment similar to FIGS. 4A-4D, except that the case 14'' is truncated and defines a sleeve that has a bottom truncated edge 50'' that covers less than a majority of an area of the mobile device 12'', unlike the other embodiments where the case 14' covers a majority of the surface area of the mobile device 12'. As with the other embodiments described herein, the case 14'' may have one or more internal walls 15'' that define apertures 17'' that cooperate with various components on the mobile device 12'', such as cameras, lenses and the like. In the embodiment of FIG. 4E, the truncated case 14'' is press-fit or slides over the end 12*d*'' of the mobile device 12'' and the earpiece 10'' becomes aligned with the speaker 12*a*''.

Referring now to FIGS. 5A-5E, another embodiment is shown having the earpiece body 26''' that is integrally formed in a case projection or wall 14*f*''' as illustrated. In this embodiment, the earpiece body 16''' has an integrally molded protrusion or protrusion support post 24''' defining an aperture 25''' that defines the sound exit 20'''. The protrusion support post 24''' may comprise a plurality of cylindrical ribs 24a''' (FIG. 5B) that facilitate retaining and maintaining the detachable earpiece tip or body 26''' on the protrusion support post 24'''. As with the embodiment described earlier herein, note that the case wall 14f''' extends generally parallel to the wall 14i''' (FIG. 5B) and defines the mobile device receiving aperture 50''' for receiving the end 12d''' of the mobile device 12'''. After the mobile device 12''' has been positioned and received in the case 14''', the speaker 12a''' becomes operatively positioned in generally aligned and opposed relationship to the sound entrance 18''' of the earpiece 10'''.

Figure 5B:
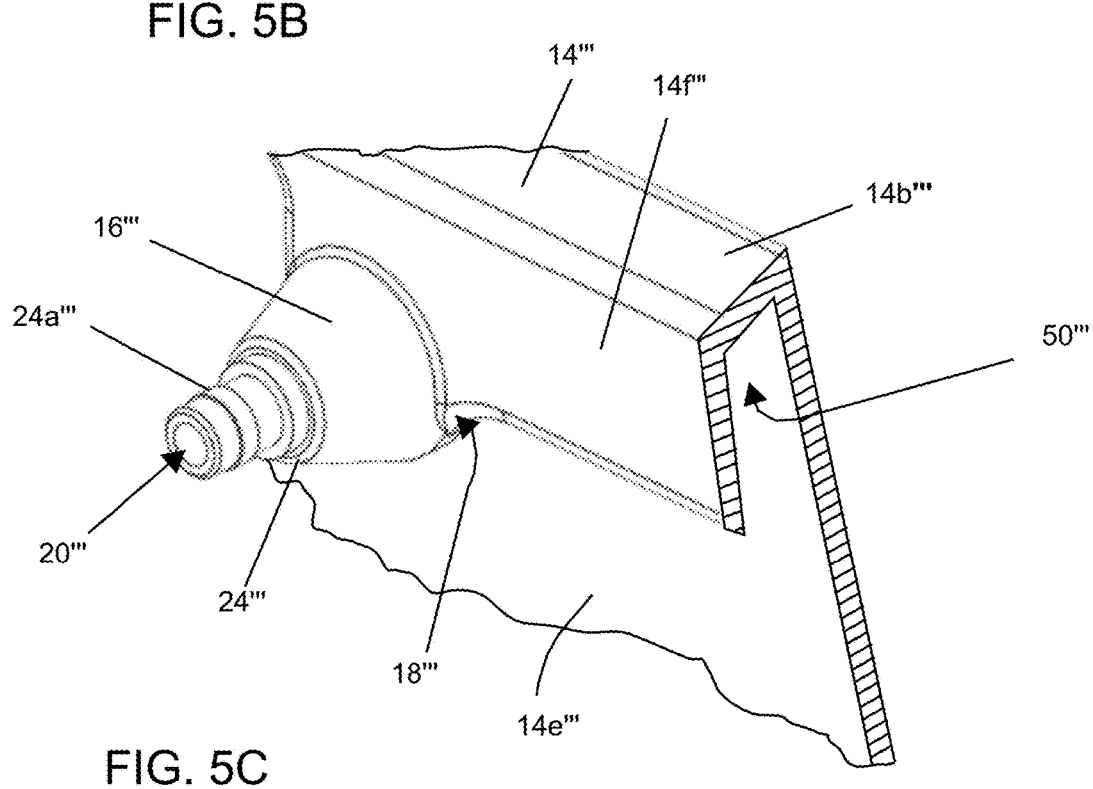
Figure 5C:
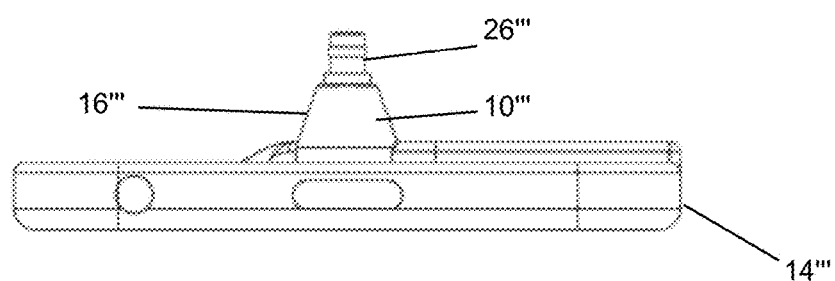

FIG. 5B is a view taken in the direction of arrow B in FIG. 5A showing the case 14''' without the mobile device 12''' mounted therein. As with the embodiment described earlier herein relative to FIGS. 1A-2F, in this embodiment, the protrusion support post 24''' is adapted to receive at least one or a plurality of interchangeable earpiece tips or bodies 26''', as illustrated in FIGS. 5D and 5E.

Figure 5D:
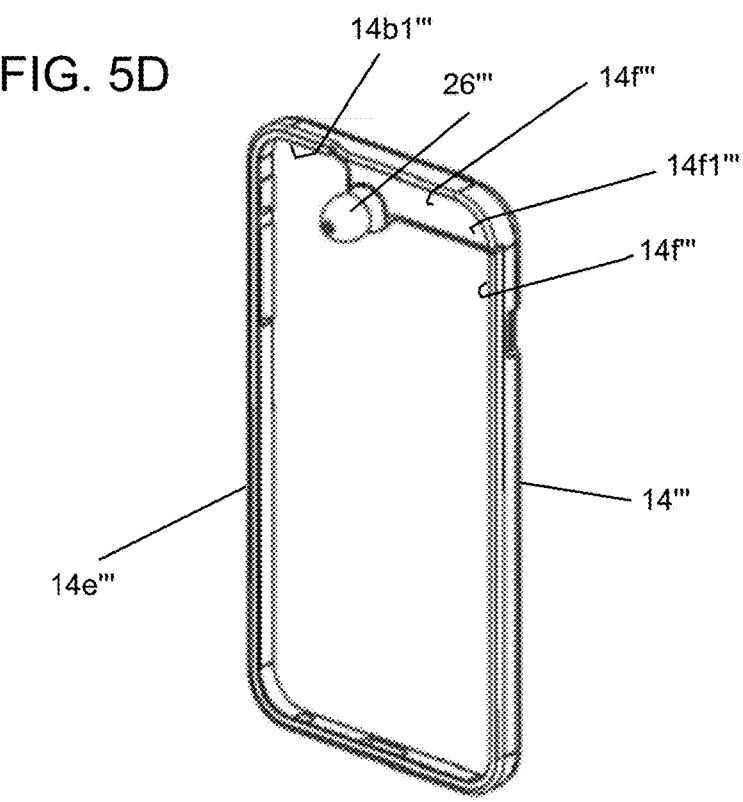
Figure 5E:
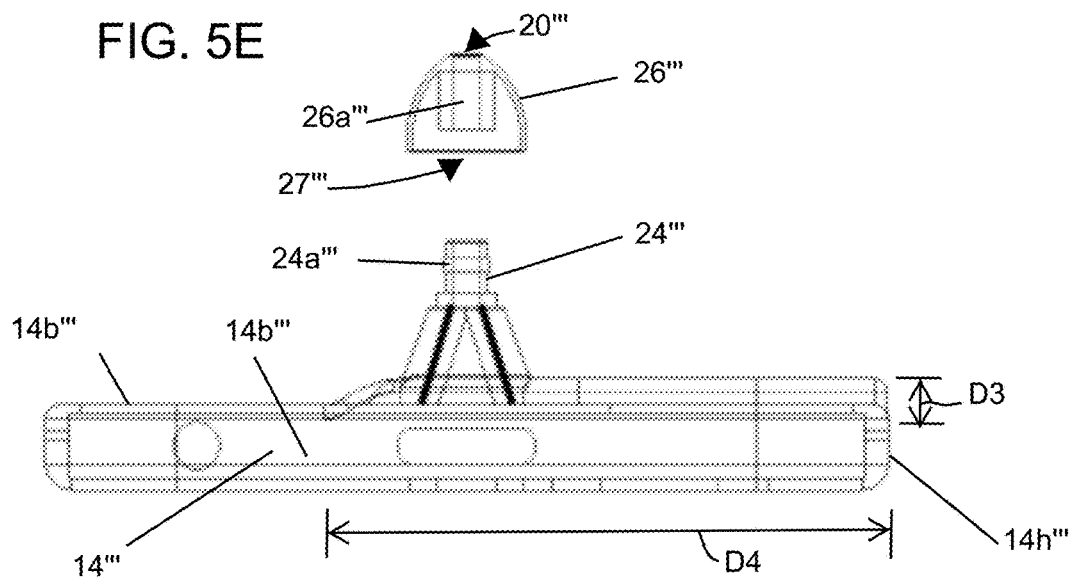

Note in FIGS. 5D and 5E that the case projection or wall 14f''' is elongated and extends outward from an edge 14b1''', as shown. In the illustration being described, the wall 14f''' is integrally formed and the wall 14b''' extends a dimension D3 (FIG. 5E), which is on the order of about 1-5 mm. Note also, that unlike the embodiment of FIGS. 4A-4D, that the wall 14f''' extends a dimension D4 and has an end 14f1''' that is integrally formed in the side wall 14y'' of the case 14'''. The inventor has found that this elongated wall 14f''' provides better support for capturing and retaining the end 14d''' of the mobile device 12''' in the case 14'''. Although not shown, it should be understood that the wall 14f''' could traverse the entire width of the case 14''' between walls 14e''' and 14g'''.

As with the embodiments described earlier herein, once the mobile device 12''' is mounted in the case 14''', the speaker 12a''' becomes operatively aligned and positioned relative to the sound entrance 18''' of the earpiece 10'''.

Figure 6A:
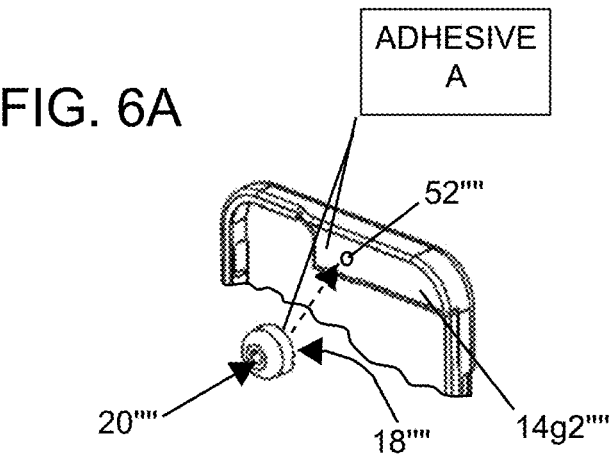
FIGS. 6A-6B illustrate an earpiece that is detachably removed from a support surface on the protective case.
Figure 6B:
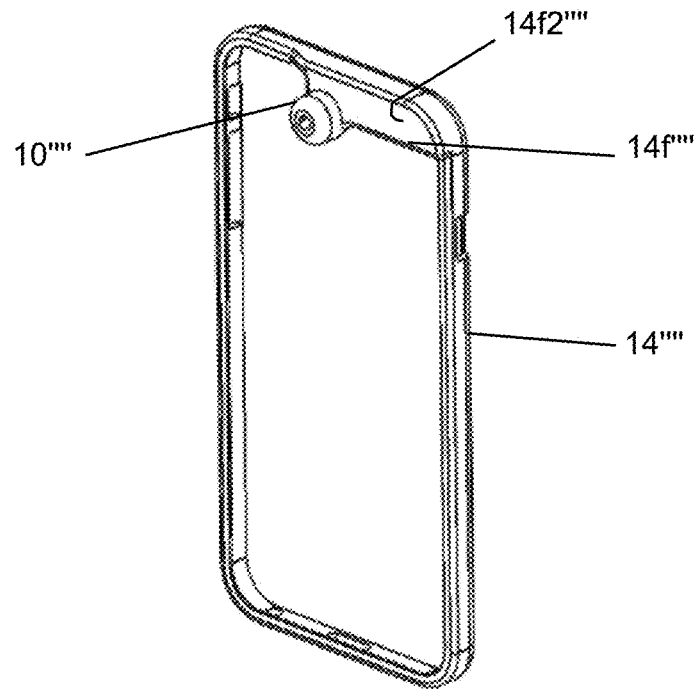

Referring now to FIGS. 6A and 6B, another embodiment is shown with a stand-alone earpiece 10'''' having a generally planar and flat rear wall 10a'''' that has an adhesive or other means A for fixing the earpiece 10'''' to either the case 14'''' or the mobile device 12''''. In this embodiment, the earpiece 10'''' comprises the rear, generally planar, wall 10a'''' that has an adhesive or other fastening means A for mounting the earpiece 10'''' onto a surface 14f2'''' of wall 14f''''. Note that the wall 14f'''' has an oval aperture 52'''' which becomes aligned with speaker 12a'''' of the mobile device 12''''. After the earpiece 10'''' is mounted as illustrated in FIG. 6B, the sound entrance 18'''' becomes operatively associated with the bottom aperture 52'''' and the speaker 12a'''' of the mobile device 12'''' when the mobile device 12'''' is mounted in the case 14''''.

Of course, it is contemplated that other means could be used for detachably or removably fastening the earpiece 10'''' to the case 14''''. One such alternative is illustrated in FIGS. 7A-7C. In this embodiment, the earpiece 10'''' comprises a mount having a generally planar mounting projection 10c''''. Note the wall 14g'''' of the case 14'''' comprises a generally U-shaped internal wall 14g3'''' that defines an aperture 54'''' that is beveled. The projection 10c'''' comprises a complementary shaped beveled wall or edge 10c1'''' so that the projection 10c'''' can be moved in the direction of arrow C in FIG. 7B and mounted onto the wall 14g'''' as illustrated in FIGS. 7A and 7C. Again, the earpiece 10'''' could be selected from a group or a plurality of earpieces having different configurations, such as the configurations illustrated in FIG. 2F, so that the user can select an appropriate earpiece for mounting onto the case 14''''. It should be understood that the embodiment shown in FIGS. 7A-7C illustrate the walls 14g'''' and 10c1'''' cooperating to define a dovetail and press-fit connection or joint for securing the earpiece 10'''' onto the case 14''''. However, other configurations and means for fastening or securing the earpiece 10'''' onto the case 14'''' are contemplated.

In another embodiment, as illustrated in FIGS. 8A-8B, the earpiece 10'''' shown and described relative to FIG. 6A is mounted directly onto the mobile device 12'''', rather than on the case 14'''' as shown in FIGS. 6A-6B.

Figure 9:
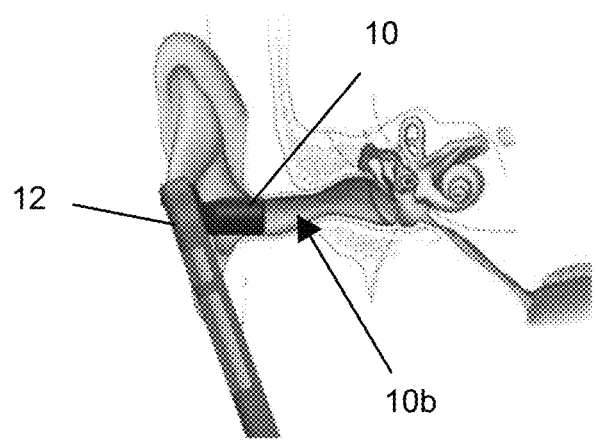
FIG. 9 is a view showing placement of the embodiment in FIG. 10 in an ear canal.

FIG. 9 illustrates how, in one embodiment, the earpiece 10 may engage an ear canal 10b of the user.

Figure 10:
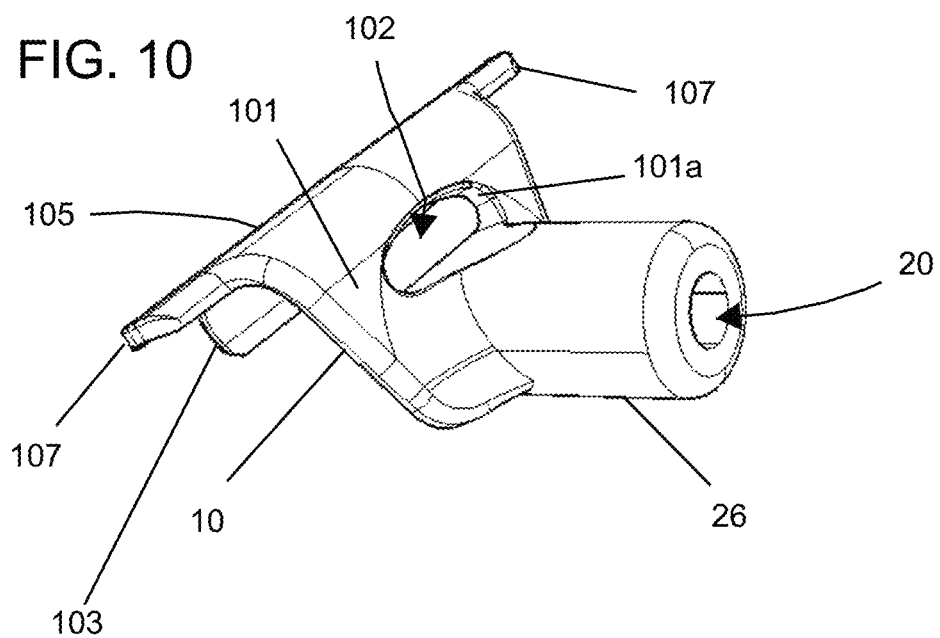
FIG. 10 is an enlarged view of the embodiment shown in FIG. 2F(ix)

In another embodiment as shown in FIG. 10, the earpiece 10 is generally U-shaped with a front wall 101 and generally opposing rear flange or wall 103 and a joining portion 105 that joins the front and rear walls 101, 103 as shown. This embodiment comprises one or more side wings 107 to allow for lateral stabilization when mounted between the case 14 and the mobile device 12. In this embodiment, the earpiece tip or body 26 is an internal, one-piece construct with the side wings 107. Note that in this embodiment, the first wall 101 has an internal wall 101a that defines an aperture 102. This aperture 102 is arranged in a predetermined position so that it becomes aligned with one or more components of the mobile device 12, such as the camera lens 12b, thereby accommodating the components of the mobile device 12.

FIGS. 11, 12 and 13 show further details of the earpiece 10 shown in FIG. 10. It should be appreciated that the earpiece 10 can be adapted and equipped with conventional wireless technology to receive a wireless signal such as Bluetooth (shown schematically in FIGS. 11, 12 and 13) or a direct signal from the mobile device, a related device, an unrelated device or even a network. In this or the other embodiments, the earpiece 10 may comprise an electrically powered speaker.

Advantageously, the embodiments shown and described herein could be used alone or together and/or in combination with one or more of the features covered by one or more of the claims set forth herein, including but not limited to one or more of the features or steps mentioned in the Summary of the Invention and the claims and in the listing below:

The earpiece 10 may be dimensioned and include various apertures, to avoid obstruction of smartphone features such as camera lenses, light sensors, position sensors, and any other function on the front or back of the mobile device 12. For example, in the embodiment of FIG. 10, the earpiece 10 comprises an internal wall 1010 that defines an aperture 102 through which a camera lens or sensor 104 may capture images (not shown) or sense data.

An earpiece 10 having a mount or clip that enables the earpiece 10 to be removably or non-removably mounted directly to the mobile device 12, with the configuration or shape of the earpiece tip or body 26 comprising a desired shape which may include one or more of the shapes shown in FIG. 2F. A plurality of interchangeable tips or bodies 26 may be provided in a group or kit for the user to select one or more tips or bodies 26 that conform to the user's outer or inner ear.

The mount 28 utilized in some embodiments may be configured such that when the mobile device 12 is mounted in the protective case 14, the earpiece 10 is immobilized by the mobile device 12 and the protective case 14 and fixed in operative relationship with the speaker 12a of the mobile device 12. As mentioned, the earpiece 10 may also have fastening means or a fastener, such as adhesive A, that enables the earpiece 10 to be mounted directly over the speaker 12a of the mobile device 12 or onto the protective case 14 as in the manner described earlier herein relative to FIGS. 6A and 6B.

The earpiece 10 may be integrally molded with the protective case 14 or it may be a separate component.

The earpiece body 16 may be integrally molded with at least a portion of the case 14 and may have an integral case protrusion or support post 24 that is adapted to receive the selected earpiece tip or body 26. Again, the earpiece tip or body 26 may be selected from a group or plurality of tips or bodies 26, each having a unique configuration or shape that is adapted to conform to the user's outer or inner ear.

Different means for fastening the earpiece 10 onto the mobile device 12 or the protective case 14 have also been shown to enable the user to mount, dismount or change the earpiece 10 or earpiece tip or body 26.

In some embodiments, the sound exit 20 is coaxial with the sound entrance 18, as shown in FIGS. 2F(i), (iii), (v), (vi) and (viii), while in other embodiments, the sound exit 20 is offset from, angled, angulated, beveled or not coaxial with respect to the sound entrance 18, as in FIGS. 2F(ii), (iv) and (vii). Note in the embodiment of FIG. 2F(vii), the earpiece tip or body 26 is a tear drop shape and the sound exit 20 is generally perpendicular to the sound entrance 18.

In another embodiment, the sound entrance 18 defines an aperture that is larger than an aperture defined by the sound exit 20.

The earpiece 10 presently amplifies sound, but it is contemplated that it could have a sound amplifier SA (FIG. 5E) that actively amplifies sound.

The earpiece 10 may be adapted to be mounted on a mobile telephone handset.

The earpiece 10 comprises a protrusion directed substantially perpendicular from handset surface and the protrusion is adapted to contact the ear of the listener.

The earpiece can be integrally or mechanically mounted to a protective handset case, the mechanical mounting being reversible, moveable, or immobile.

The earpiece and/or the handset case can be mounted to a telephone handset via mechanical means, such a friction, clipping, adhesion or interference.

The earpiece can be made from any material adapted to engage the ear of the listener and minimize sound leakage between the listener and the earpiece. The material can be rigid, soft, or malleable.

The earpiece adapted to be mounted on a mobile telephone handset may comprise an internal aperture or notch defined by a sound entrance on the handset side and a sound exit on the listener side.

The sound entrance can have a larger area than the sound exit.

The earpiece adapted to be mounted on a mobile telephone handset can comprise a multiple piece assembly, with mounting means for a separate changeable tip.

The earpiece may contain a passive or active amplification means to amplify sound emerging from the headset.

The earpiece may comprise a protrusion angulating from handset in manner to compliment outer ear anatomy.

The sound exit may be angulated, beveled, or offset from the sound entrance.

The earpiece adapted to be mounted on a mobile telephone handset may comprise a multiple piece assembly with mounting means for a separate changeable tip.

The earpiece may comprise one or more internal chambers for the directing of sound.

The earpiece adapted to be mounted on a mobile telephone handset may at least partially reside between the handset and the handset case, the handset case being defined as a covering at least partially surrounding and/or attached to a mobile telephone handset.

The earpiece stabilized by friction or other mechanical means between the handset case and the handset.

The earpiece may be adapted to be mounted or clipped onto an upper portion of the handset, proximate to the handset ear speaker resulting in partial stabilization of the earpiece, cooperating with partial stabilization of an overlying protective handset case.

The method of:
  placing an earpiece on a mobile telephone handset wherein the earpiece is not fully stabilized on the handset;
  placing a handset case, the handset case being defined as a covering that at least partially surrounds and/or is attached to a mobile telephone handset;
  wherein the placement increases the stabilization of the earpiece to the handset and resulting in the earpiece residing at least partially between the case and the handset.

The earpiece can also be mounted on at least a portion of a mobile device and comprise an earpiece support and an earpiece body that is associated with the earpiece support. The earpiece body may comprise a sound receiver for receiving a sound signal, a sound outlet and at least one internal means for acoustically amplifying the sound signal to the sound outlet. As mentioned earlier, the earpiece may also be equipped with wireless capability, such as Bluetooth. The earpiece support may be adapted and configured to be mounted on or formed in at least one of a portion of the mobile device, a mount for mounting on the mobile device or a case for the mobile device so that the sound receiver can receive the sound signal. At least one internal means may comprise an electronic means such as an electronic amplifier and the sound receiver may comprise a microphone, or means for receiving a wireless signal such as Bluetooth or a direct signal from the mobile device, a related device or a network. The sound outlet may also comprise an electrically powered speaker and the earpiece may cover or surround a portion of the electrically powered speaker.

Although not shown, one or more of the features of the embodiment may be used in reverse as a mouthpiece audio amplifier in association with a microphone. In other words, the shape of the internal earpiece 10 may be situated in operative relationship with a microphone so that it amplifies sounds (e.g., a user's voice) for reception by a microphone.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. An earpiece for use with a mobile device, said earpiece comprising:

an earpiece body having a sound entrance, a sound exit and at least one internal aperture coupling said sound entrance and said sound exit;

said earpiece body being adapted to be detachably mounted on at least one of said mobile device or a case for said mobile device so that said sound entrance becomes operatively associated with a speaker of said mobile device so that a user can position said sound exit in or near said user's ear;

wherein said mobile device is a mobile telephone, said earpiece comprising a mount adapted to permit said earpiece to be removably mounted onto said mobile telephone or said case proximate to a speaker of said mobile device; and wherein said mount comprises a mounting projection, said mobile device or said case having a wall that defines a connection area having a predetermined shape, said mounting projection being adapted and shaped to generally complement said predetermined shape so that when said mounting projection is received in said connection area, said earpiece becomes mounted to said mobile telephone or said case in proximity to said speaker of said mobile telephone.

2. The earpiece as recited in claim 1 wherein said sound exit defines a protrusion or earpiece tip.

3. The earpiece as recited in claim 2 wherein said protrusion or earpiece tip is at least one of angulated, beveled or offset from said sound entrance.

4. The earpiece as recited in claim 2 wherein said protrusion or earpiece tip comprises a protrusion shape that is adapted to complement said user's ear anatomy.

5. The earpiece as recited in claim 4 wherein said protrusion shape comprises a shape that is generally spherical, cylindrical, bulbous, generally rectangular, polygonal, elongated, curved or the like.

6. The earpiece as recited in claim 2 wherein said protrusion or earpiece tip comprises a protrusion support post integrally formed in said earpiece body and said protrusion or earpiece tip defines a protrusion shape, said protrusion or earpiece tip being adapted to be removably mounted on said protrusion support post.

7. The earpiece as recited in claim 6 wherein said protrusion support post is substantially perpendicular with respect to a surface of said mobile device.

8. The earpiece as recited in claim 6 wherein said protrusion or earpiece tip is selected from a plurality of interchangeable earpiece tips, each being adapted to be removably mounted on said protrusion support post.

9. The earpiece as recited in claim 1 wherein said mount is configured so that said earpiece is at least one of reversible, moveable or immobile when mounted on said mobile device.

10. The earpiece as recited in claim 1 wherein said mounting projection defines a first wall on said earpiece body, said wall of said mobile device having a mating second wall, said first and second walls cooperating to secure said earpiece to said case.

11. The earpiece as recited in claim 10 wherein said first and second walls are beveled and define a dovetail connection when said earpiece is mounted on said mobile device or said case.

12. The earpiece as recited in claim 1 wherein said earpiece body comprises a mounting clip for mounting on said mobile device, said mounting clip being adapted to be situated between said mobile device and said case for said mobile device to facilitate stabilizing or holding said earpiece in a predetermined position on said mobile device.

13. The earpiece as recited in claim 12 wherein said mounting clip is generally U-shaped and has a first wall having an aperture that defines said sound entrance.

14. The earpiece as recited in claim 13 wherein said mounting clip is generally U-shaped and has a second wall that generally opposes said first wall and a joining portion that joins said first and second walls, said first and second walls being flexible and elastic to permit said mounting clip to retain said earpiece body in operative relationship with a speaker of said mobile device.

15. The earpiece as recited in claim 12 wherein said mobile device comprises a first end and a speaker associated with said first end, said mounting clip being adapted and sized to engage and be mounted on said first end.

16. The earpiece as recited in claim 12 wherein said mobile device comprises a first end, a speaker associated with said first end, and a second end that generally opposes said first end, said mounting clip being adapted and sized to engage and be mounted on said first and second ends.

17. The earpiece as recited in claim 12 wherein said mounting clip is generally U-shaped and has a first wall that engages a first end of said mobile device, a second wall that engages a second end of said mobile device, and an elongated portion for joining said first wall and said second wall.

18. The earpiece as recited in claim 1 wherein said earpiece body is integrally formed in a case for said mobile device.

19. The earpiece as recited in claim 1 wherein said earpiece body is integrally formed in or affixed directly to a surface in operative relationship with a speaker of said mobile device.

20. The earpiece as recited in claim 1 wherein said at least one internal aperture and said sound exit are configured to provide passive sound amplification.

21. The earpiece as recited in claim 1 wherein said earpiece has an active sound amplifier.

22. The earpiece as recited in claim 1 wherein said sound entrance defines an area that is larger than an area of said sound exit.

23. The earpiece as recited in claim 1 wherein said earpiece body is at least one of rigid, soft or malleable to engage said user's ear and facilitate minimizing sound leakage between said user and said earpiece.

24. The earpiece as recited in claim 1 wherein said earpiece comprises a mechanical mount defining a clip for mounting on said mobile device.

25. The earpiece as recited in claim 1 wherein said earpiece body comprises at least one wing for providing support when said earpiece is mounted on said mobile device.

26. The earpiece as recited in claim 1 wherein said earpiece has at least one of an amplifier or a wireless system.

27. An earpiece for mounting on at least a portion of a mobile device, said earpiece comprising:
    an earpiece support; and
    an earpiece body associated with said earpiece support, said earpiece body comprising a sound inlet, a sound outlet and at least one internal channel for acoustically coupling said sound inlet to said sound outlet;
    wherein said earpiece support is adapted to be detachably mounted on at least one of a portion of said mobile device, a mount for mounting on said mobile device, or a case for said mobile device so that said sound inlet becomes positioned in operative relationship with a speaker of said mobile device;

wherein said earpiece support comprises at least one projection defining a clip for mounting on said portion of said mobile device;

wherein said at least a portion of said clip becomes situated between said mobile device and a protective case that is mounted on said mobile device after said clip and said protective case are mounted on said mobile device.

28. The earpiece as recited in claim 27 wherein said earpiece body has a first end integrally formed in said case.

29. The earpiece as recited in claim 27 wherein said earpiece body has a first end that is fastened or adhered to at least one of said case or directly on said mobile device.

30. The earpiece as recited in claim 27 wherein said earpiece body has a first end that is fastened, adhered to or integrally formed in said earpiece support and a second end that has a predetermined shape.

31. The earpiece as recited in claim 30 wherein said predetermined shape defines an earpiece tip that is at least one of generally cylindrical, bulbous, spherical, tear drop, conical, frusto-conical or comprises a decreasing cross section from said sound inlet to said sound outlet.

32. The earpiece as recited in claim 27 wherein said sound outlet is coaxial with said sound inlet.

33. The earpiece as recited in claim 27 wherein said sound outlet is offset from, angulated or not coaxial with respect to said sound inlet.

34. The earpiece as recited in claim 27 wherein said earpiece body has a first end integrally formed or mounted on said mount, said earpiece body having an earpiece projection adapted to define or receive an earpiece tip.

35. The earpiece as recited in claim 34 wherein said earpiece tip is selected from a group or plurality of interchangeable tips.

36. The earpiece as recited in claim 35 wherein said group or plurality of interchangeable tips comprise different shapes or sizes adapted to fit or conform to at least a portion of a user's ear.

37. The earpiece as recited in claim 27 wherein said earpiece support is configured and adapted to receive said mobile device.

38. The earpiece as recited in claim 27 wherein said clip is generally U-shaped.

39. The earpiece as recited in claim 27 wherein said clip comprises a width that is substantially the same as a diameter of said earpiece.

40. The earpiece as recited in claim 27 wherein said at least one projection comprises a first leg portion having a predetermined length, said predetermined length generally corresponding to a distance between a mounting edge of said mobile device and a speaker of said mobile device.

41. The earpiece as recited in claim 27 wherein said clip comprises a first end having a generally U-shape defining an aperture for receiving at least a portion of said mobile device, a second end for engaging an end of said mobile device and an elongated joining portion for joining said first and second ends, said earpiece being associated with said first end.

42. The earpiece as recited in claim 27 wherein said case comprises a protective case, said earpiece support of said earpiece comprises a portion that is integrally formed in said protective case adapted to be mounted on at least a portion of said mobile device.

43. The earpiece as recited in claim 42 wherein said protective case covers a majority of said mobile device.

44. The earpiece as recited in claim 42 wherein said protective case is mounted on said mobile device and covers less than a majority of said mobile device.

45. The earpiece as recited in claim 27 wherein said sound inlet defines an aperture that is larger than an aperture defined by said sound outlet.

46. The earpiece as recited in claim 27 wherein said earpiece body is frusto-conical in cross section.

47. The earpiece as recited in claim 27 wherein said case comprises a protective case, said earpiece support comprises a mount for mounting said earpiece on said protective case.

48. The earpiece as recited in claim 47 wherein said mount defines a connection comprising at least one beveled wall that defines a mounting area on said case, said earpiece support having a generally planar portion comprising at least one beveled surface adapted to mate with said at least one beveled wall so that said earpiece support can be removably mounted on said case.

49. The earpiece as recited in claim 48 wherein said at least one beveled wall and said at least one beveled surface defines a dovetail connection.

50. The earpiece as recited in claim 27 wherein said earpiece support comprises a mounting clip, said earpiece body having a first end integrally formed or mounted on said mounting clip and a second end that defines or is adapted to receive an earpiece tip.

51. The earpiece as recited in claim 50 wherein said earpiece tip is selected from a group or plurality of interchangeable tips.

52. The earpiece as recited in claim 51 wherein said group or plurality of interchangeable tips comprise different shapes or sizes adapted to fit or conform to at least a portion of a user's ear.

53. The earpiece as recited in claim 27 wherein said earpiece has at least one of an amplifier or a wireless system.

54. The earpiece as recited in claim 27 wherein said earpiece comprises a plurality of wings for facilitating stabilization of said earpiece.

55. The earpiece as recited in claim 27 wherein said earpiece body has a wall having an aperture that becomes aligned with a component of said mobile device when said earpiece is mounted thereon.

56. A method of placing an earpiece on a mobile device, wherein said earpiece is not fully stabilized on said mobile device, said method comprising the step of:

placing a handset case on said mobile device, said handset case being defined as a covering that at least partially surrounds and/or is attached to said mobile device;

said placement of said handset case increasing the stabilization of said earpiece to said mobile device and resulting in said earpiece residing at least partially between said handset case and said mobile device;

wherein said mobile device is a mobile telephone, said earpiece comprising a mount adapted to permit said earpiece to be removably mounted onto said mobile telephone or said case proximate to a speaker of said mobile device;

wherein said mount comprises a mounting projection, said mobile device or said case having a wall that defines a connection area having a predetermined shape, said mounting projection being adapted and shaped to generally complement said predetermined shape so that when said mounting projection is received in said connection area, said earpiece becomes mounted to said mobile telephone or said case in proximity to said speaker of said mobile telephone.

57. An earpiece for mounting on at least a portion of a mobile device, said earpiece comprising:
- an earpiece support; and
- an earpiece body associated with said earpiece support, said earpiece body comprising:
  - a sound receiver for receiving a sound signal;
  - a sound outlet; and
  - at least one internal means for acoustically amplifying said sound signal to said sound outlet;
- wherein said earpiece support is adapted to be detachably mounted on at least one of a portion of said mobile device, a mount for mounting on said mobile device or a case for said mobile device so that said sound receiver can receive said sound signal;
- wherein said at least one internal means comprises an electronic means such as an electronic amplifier;
- wherein said sound receiver comprises a microphone, or means for receiving a wireless signal such as Bluetooth or a direct signal from said mobile device, a related device or a network;
- wherein said sound outlet comprises an electrically powered speaker;
- wherein said earpiece covers or surrounds a portion of said electrically powered speaker;
- wherein said mobile device is a mobile telephone, said earpiece comprising a mount adapted to permit said earpiece to be removably mounted onto said mobile telephone or said case proximate to a speaker of said mobile device;
- wherein said mount comprises a mounting projection, said mobile device or said case having a wall that defines a connection area having a predetermined shape, said mounting projection being adapted and shaped to generally complement said predetermined shape so that when said mounting projection is received in said connection area, said earpiece becomes mounted to said mobile telephone or said case in proximity to said speaker of said mobile telephone.

\* \* \* \* \*

UNITED STATES PATENT AND TRADEMARK OFFICE
CERTIFICATE OF CORRECTION

PATENT NO. : 10,362,382 B2  
APPLICATION NO. : 15/472772  
DATED : July 23, 2019  
INVENTOR(S) : David Louis Kirschman Page 1 of 1

It is certified that error appears in the above-identified patent and that said Letters Patent is hereby corrected as shown below:

In the Specification

Column 13, Line 28, delete "14y'''" and insert --14g'''-- therefor.

Signed and Sealed this  
Third Day of September, 2019

Andrei Iancu  
*Director of the United States Patent and Trademark Office*